(12) United States Patent
Hashimoto et al.

(10) Patent No.: US 6,915,045 B2
(45) Date of Patent: Jul. 5, 2005

(54) OPTICAL WAVEGUIDE TYPE GRATING ELEMENT, PRODUCTION METHOD THEREOF, MULTIPLEXER/DEMULTIPLEXER MODULE, AND OPTICAL TRANSMISSION SYSTEM

(75) Inventors: Ken Hashimoto, Yokohama (JP); Manabu Shiozaki, Yokohama (JP); Toshikazu Shibata, Osaka (JP); Akira Inoue, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 124 days.

(21) Appl. No.: 10/651,287

(22) Filed: Aug. 29, 2003

(65) Prior Publication Data

US 2004/0114864 A1 Jun. 17, 2004

(30) Foreign Application Priority Data

Aug. 29, 2002 (JP) .................................. P2002-251647

(51) Int. Cl.$^7$ ............................. G02B 6/34; H04J 14/02
(52) U.S. Cl. ............................. 385/37; 385/1; 385/122; 385/123; 398/81; 398/84; 398/87
(58) Field of Search ............................. 385/1, 2, 3, 37, 385/14, 129, 130, 131, 122, 123; 398/81, 84, 85, 87, 79

(56) References Cited

U.S. PATENT DOCUMENTS

| | | | | |
|---|---|---|---|---|
| 5,598,300 A | * | 1/1997 | Magnusson et al. | 359/566 |
| 6,321,011 B2 | * | 11/2001 | Deacon | 385/50 |
| 6,324,204 B1 | * | 11/2001 | Deacon | 372/96 |
| 6,373,872 B2 | * | 4/2002 | Deacon | 372/34 |
| 6,393,185 B1 | * | 5/2002 | Deacon | 385/50 |
| 6,404,956 B1 | * | 6/2002 | Brennan et al. | 385/37 |
| 6,427,040 B1 | * | 7/2002 | Ahuja et al. | 385/37 |
| 6,628,864 B2 | * | 9/2003 | Richardson et al. | 385/37 |

FOREIGN PATENT DOCUMENTS

| | | | | |
|---|---|---|---|---|
| JP | 2002-090556 | | 3/2002 | 385/37 X |
| JP | 2002-090557 | | 3/2002 | 385/37 X |

* cited by examiner

Primary Examiner—Brian M. Healy
(74) Attorney, Agent, or Firm—McDermott Will & Emery LLP

(57) ABSTRACT

The present invention relates to an optical waveguide type grating element and others in structure for decreasing absolute values of chromatic dispersion occurring in selective reflection of each of signal channels in a reflection band. The optical waveguide type grating element is provided with an optical waveguide in which signal light containing a plurality of signal channels spaced at a channel spacing $\lambda_i$ propagates, and a grating which is an index modulation formed over a predetermined range of the optical waveguide. Particularly, the optical waveguide type grating element has a transmittance of $-20$ dB or less for each of the signal channels in the reflection band, and has a reflectance of $-20$ dB or less for each of signal channels outside the reflection band. Furthermore, a deviation of a group delay time of each of the signal channels in the reflection band, which is caused by reflection in the grating, is 10 ps or less in a wavelength range of $(\lambda_{CH} - \lambda_i \times 0.375/2)$ or more but $(\lambda_{CH} + \lambda_i \times 0.375/2)$ or less, where $\lambda_{CH}$ is a center wavelength of each signal channel.

13 Claims, 20 Drawing Sheets

OPTICAL WAVEGUIDE TYPE GRATING ELEMENT, PRODUCTION METHOD THEREOF, MULTIPLEXER/DEMULTIPLEXER MODULE, AND OPTICAL TRANSMISSION SYSTEM

BACKGROUND OF THE INVENTION

1. Field of the Invention

The present invention relates to an optical waveguide type grating element in which a grating is formed over a predetermined range of an optical waveguide, a production method thereof, a multiplexer/demultiplexer module incorporating the optical waveguide type grating element, and an optical transmission system incorporating the multiplexer/demultiplexer module.

2. Related Background Art

An optical waveguide type grating element is an optical device in which a refractive index modulation (grating) is formed over a predetermined range along a light guiding direction in an optical waveguide (e.g., an optical fiber). The optical waveguide type grating element selectively reflects a signal channel in a predetermined reflection band out of a plurality of signal channels propagating in the optical waveguide, by means of the grating. A multiplexer/demultiplexer module incorporating this optical waveguide type grating element is configured to selectively reflect a signal channel in the reflection band by means of the optical waveguide type grating element to effect multiplexing or demultiplexing of the signal channel. For this reason, the multiplexer/demultiplexer module is applied to WDM (Wavelength Division Multiplexing) transmission systems and others for transmitting signal light (multiplexed signal light) in which a plurality of signal channels are multiplexed.

In general, the optical waveguide type grating element is provided with the grating obtained by forming a refractive index modulation of a definite period $\Lambda$ along the light guiding direction over the predetermined range of the optical waveguide. This grating selectively reflects light of a wavelength $\lambda$ satisfying the Bragg condition represented by the equation of $\lambda = 2N \cdot \Lambda$, but transmits the other wavelength components. In this equation, N indicates an average effective index of refraction in the index modulated region of the optical waveguide.

When M gratings being index modulations of mutually different periods $\Lambda_m$ are formed in mutually different regions along the light guiding direction of the optical waveguide, the optical waveguide type grating element becomes able to selectively reflect M optical components of respective wavelengths $\lambda_m$ ($= 2N \cdot \Lambda_m$) (m=1–M, where M≧2). However, the optical waveguide type grating element configured to selectively reflect the plurality of wavelength components as described above becomes long in total and high in cost, because the gratings are formed in their respective regions different from each other along the light guiding direction of the optical waveguide.

In contrast to it, there are known optical waveguide type grating elements in which a grating being an index modulation is formed over a predetermined range of the optical waveguide and in which the grating selectively reflects some of signal channels out of the signal channels propagating in the optical waveguide. For example, such grating elements include optical waveguide type grating elements in which an amplitude profile of the index modulation in the predetermined range is given by a sine function, and optical waveguide type grating elements in which index modulations of periods $\Lambda_m$ (m=1–M) are superposed in the predetermined range. These grating elements are short in total and low in cost, because the grating being the index modulation is formed in only one range along the light guiding direction in the optical waveguide.

SUMMARY OF THE INVENTION

The Inventor conducted research on the above prior art and found the following problem.

Namely, the optical waveguide type grating elements capable of selectively reflecting a plurality of signal channels as described above can be totally short, but involve a problem of chromatic dispersion in reflection of each of the plurality of signal channels in the reflection band. Specifically, the reflection of the signal channels in the grating occurs everywhere in the light guiding direction in the grating, so that effective reflection positions become different according to wavelengths. This causes a group delay of reflected light. If wavelength dependence of the group delay time is significant in the reflection band, the reflection in the optical waveguide type grating element will lead to waveform degradation of signal light, so as to cause reception error readily, which will hinder implementation of high-capacity transmission in the WDM transmission.

The present invention has been accomplished in order to solve the problem described above and an object of the present invention is to provide an optical waveguide type grating element capable of decreasing the absolute value of chromatic dispersion occurring in the selective reflection of each of a plurality of signal channels in the reflection band, a production method thereof, a multiplexer/demultiplexer module incorporating the optical waveguide type grating element, and an optical transmission system incorporating the multiplexer/demultiplexer module.

An optical waveguide type grating element according to the present invention is an optical device for selectively reflecting each of signal channels in a reflection band out of a plurality of signal channels spaced at a channel spacing $\lambda_i$, which comprises an optical waveguide in which signal light including the plurality of signal channels propagates, and a grating which is an index modulation formed over a predetermined range of the optical waveguide. Particularly, the optical waveguide type grating element has a transmittance of −20 dB or less for each of the signal channels in the reflection band, and has a reflectance of −20 dB or less for each of signal channels outside the reflection band. In the optical waveguide type grating element according to the present invention, a deviation of a group delay time of each of the signal channels in the reflection band, which is caused by reflection in the grating, is 10 ps or less in a wavelength range of $(\lambda_{CH} - \lambda_i \times 0.375/2)$ or more but $(\lambda_{CH} + \lambda_i \times 0.375/2)$ or less, where $\lambda_{CH}$ is a center wavelength of each signal channel.

In the present specification, the term "outside the reflection band" represents regions in which signal channels adjacent to a signal channel as a target for reflection exist; for example, where a signal channel of a center wavelength $\lambda_{CH+1}$ and a signal channel of a center wavelength $\lambda_{CH-1}$ are adjacent on the long wavelength side and on the short wavelength side, respectively, to a signal channel of a center wavelength $\lambda_{CH}$, a wavelength range of $(\lambda_{CH-1} + \lambda_i \times 0.375/2)$ or less and a wavelength range of $(\lambda_{CH+1} - \lambda_i \times 0.375/2)$ or more correspond to the regions outside the reflection band of the signal channel of the center wavelength $\lambda_{CH}$.

In the optical waveguide type grating element according to the present invention, the deviation of the group delay time of each of the plurality of signal channels in the reflection band, which is caused by reflection in the grating, becomes small in the above wavelength range centered around the center wavelength of each signal channel. This implements the decrease of chromatic dispersion occurring in the selective reflection of each of the plurality of signal channels in the reflection band.

In the optical waveguide type grating element according to the present invention, an absolute value of a chromatic dispersion of each of the plurality of signal channels in the reflection band, which is caused by reflection in the grating, is preferably 0.8 ps/nm or less in the wavelength range of $(\lambda_{CH}-\lambda_i\times0.375/2)$ or more but $(\lambda_{CH}+\lambda_i\times0.375/2)$ or less, where $\lambda_{CH}$ is a center wavelength of each signal channel. In this case, the absolute value of the chromatic dispersion occurring in the selective reflection of each of the plurality of signal channels in the reflection band becomes sufficiently small, so that the grating element can be applied to high-quality optical transmission systems.

In the optical waveguide type grating element according to the present invention, an amplitude profile of the index modulation over the above predetermined range preferably has a phase inverted portion. In this case, the group delay characteristic or chromatic dispersion characteristic as described above can be suitably implemented.

In the optical waveguide type grating element according to the present invention, absolute values of amplitudes of the index modulation over the predetermined range are preferably symmetric with respect to a center of the predetermined range. In this case, the optical waveguide type grating element has equivalent optical characteristics on the both sides, independent of where signal light enters, and it becomes feasible to largely decrease the number of components in application as a component to optical ADM.

In the optical waveguide type grating element according to the present invention, transmittances for the respective signal channels in the reflection band are preferably different from each other. In the optical waveguide type grating element, a transmittance for a signal channel of a shortest wavelength or for a signal channel of a longest wavelength out of the plurality of signal channels in the reflection band is preferably different from a transmittance at a center wavelength of the reflection band. In this case, it becomes easy to control the reflectance for each signal channel outside the reflection band at a low level.

Next, a method of producing the optical waveguide type grating element of the structure as described above (the optical waveguide type grating element according to the present invention) comprises a step of expressing the index modulation being the grating by a sum of functions of respective index modulation periods, a step of performing optimization designing of values of the respective index modulation periods, and a step of producing the optical waveguide type grating element on the basis of the index modulation periods thus designed. The index modulation periods are preferably designed so as to allow for manufacturing error, in order to achieve a good optical characteristic even with variation of amplitude modulation amounts. The production method may also be arranged to design an amplitude profile of the index modulation being the grating by nonlinear programming and to produce the optical waveguide type grating element on the basis of the amplitude profile thus designed. The above optical waveguide type grating element (the optical waveguide type grating element according to the present invention) can be suitably produced by this production method.

A multiplexer/demultiplexer module according to the present invention comprises the optical waveguide type grating element of the structure as described above (the optical waveguide type grating element according to the present invention). The multiplexer/demultiplexer module selectively reflects each of a plurality of signal channels in the reflection band by means of the optical waveguide type grating element to effect multiplexing or demultiplexing of the signal channels. In the multiplexer/demultiplexer module, the difference is small among group delays in the reflection of signal channels in the reflection band by the grating in the optical waveguide type grating element, and thus the waveform degradation of the reflected signal light is effectively restrained.

Furthermore, an optical transmission system according to the present invention is an optical transmission system for transmitting signal light in which a plurality of signal channels of mutually different wavelengths are multiplexed (multiplexed signal light), which comprises the multiplexer/demultiplexer module of the structure as described above (the multiplexer/demultiplexer module according to the present invention). The optical transmission system effectively restrains the waveform degradation of the signal light and is thus able to achieve implementation of high-capacity transmission in the WDM transmission.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Each of Embodiments of the optical waveguide type grating element and others according to the present invention will be described below in detail with reference to FIGS. 1, 2, 3A–18E, 19, and 20. The same reference symbols will denote the same elements throughout the description of the drawings, without redundant description thereof.

Figure 1:
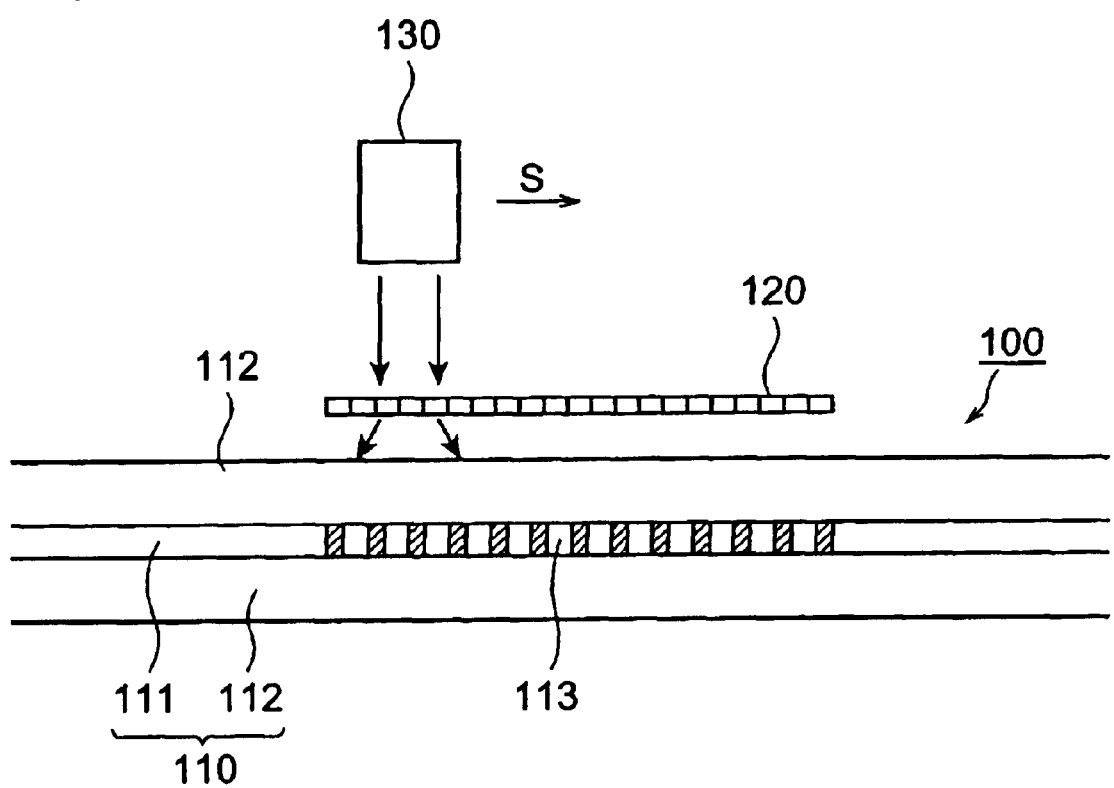
FIG. 1 is a diagram for explaining the structure and production method of the optical waveguide type grating element according to the present invention.

First, the optical waveguide type grating element and production method thereof according to the present invention will be described. FIG. 1 is a diagram for explaining the structure and production method of the optical waveguide type grating element according to the present invention. This figure shows a cross section of the optical waveguide type grating element 100 cut by a plane including the optical axis. The optical waveguide type grating element 100 is comprised of optical fiber 110 being an optical waveguide, and grating 113 formed in the optical fiber 110. The optical fiber 110 is an optical waveguide mainly containing silica glass and is comprised of core region 111 including the center of optical axis, and cladding region 112 provided on the periphery of the core region 111. The core region 111 is doped with $GeO_2$ and the grating 113 is formed over a predetermined range along the light guiding direction in the core region 111.

The grating 113 is made, for example, by moving laser light source 130 with phase plate 120 in between in the direction indicated by arrow S to form an index modulation along the light guiding direction in the core region 111 containing $GeO_2$, as shown in FIG. 1. When the z-axis is set along the light guiding direction with the origin at a center position of the predetermined range where the grating 113 is formed, the index modulation n(z) of this grating 113 is expressed by Eq (1) below.

$$n(z) = n_0 + \sum_{m=1}^{M} \Delta n_m(z) \cos\left(\frac{2\pi}{\Lambda_0 + \Delta\Lambda_m} z + \theta_m\right) \quad (1)$$

In this equation, M represents the number of signal channels to be reflected. In the grating 113, M (M is an integer not less than 2) gratings are superimposed, and the mth grating out of the M superimposed gratings corresponds to a wavelength $\lambda_m$ of a signal channel to be reflected (m=1–M). The first term $n_0$ on the right side in the equation represents an average refractive index. Furthermore, $\Delta n_m(z)$ represents an apodization function of the mth grating, $\Lambda_0 + \Delta\Lambda_m$ a period of the mth grating, and $\theta_m$ a phase at the position z=0 of the mth grating.

Eq (1) above is approximated by Eqs (2a), (2b) below, supposing $\Lambda_0$ is sufficiently larger than $\Delta\Lambda_m$.

$$n(z) = n_0 + F(z)\cos\left(\frac{2\pi}{\Lambda_0}z\right) \quad (2a)$$

$$F(z) = \sum_{i=1}^{N} n_i \sin\left(\frac{2\pi i}{L}z\right) \quad (2b)$$

Here the function F(z) in above Eq (2b) is an odd function which is expressed by Fourier series expansion under the conditions that the grating 113 is formed over the range from z=−L/2 to z=+L/2 and the values of F(−L/2) and F(+L/2) are 0 (where the approximation is made by a sum of the finite number N of sine functions).

Eq (2b) above may be replaced by a function F(z) expressed by Eq (3) or Eq (4) below.

$$F(z) = \sum_{i=1}^{N} n_i \cos\left(\frac{2\pi(i-1)}{L}z\right) \quad (3)$$

$$F(z) = \sum_{i=1}^{N} n_i \sin\left(\frac{2\pi i}{L}z\right) + \sum_{i=1}^{N} n'_i \cos\left(\frac{2\pi(i-1)}{L}z\right) \quad (4)$$

Here the function F(z) of above Eq (3) is an even function which is expressed by Fourier series expansion (where the approximation is made by a sum of the finite number N of cosine functions). The function F(z) of above Eq (4) is a general form of above Eq (2b) plus above Eq (3).

As seen from the above, the index modulation n(z) in the grating 113 of the optical waveguide type grating element 100 is expressed as a sum of functions of the respective M index modulation periods ($\Lambda_0 + \Delta\Lambda_m$) (above Eq (1)). Then the optical waveguide type grating element 100 is designed by optimizing values of these respective M index modulation periods ($\Lambda_0 + \Delta\Lambda_0$) and is produced on the basis of an amplitude profile of the index modulation designed in this way. This amplitude profile is preferably designed to allow for manufacturing error, in order to achieve a good optical characteristic even with variation of amplitude modulation amounts.

In another method, the optical waveguide type grating element 100 may be produced by designing the amplitude profile of the index modulation being the grating 113 by nonlinear programming (e.g., Simulated Annealing) and forming the grating on the basis of the amplitude profile thus designed.

The optical waveguide type grating element 100 selectively reflects each of M channels in the reflection band out of the plurality of signal channels spaced at the channel spacing $\lambda_i$ in the light guided through the optical fiber 110, by the grating 113. When this optical waveguide type grating element 100 is applied to an optical transmission system, the plurality of signal channels (multiplexed) in the signal light injected into this optical waveguide type grating element 100 have a fixed optical frequency spacing defined by ITU Standards.

The optical waveguide type grating element 100 has the transmittance of −20 dB or less for each of the M channels in the reflection band, and has the reflectance of −20 dB or less, preferably −30 dB or less, for each of signal channels outside the reflection band. Furthermore, in the optical waveguide type grating element 100, a deviation of a group delay time of each of the M channels in the reflection band, which is caused by reflection in the grating 113, is 10 ps or less and, preferably, 1 ps or less in the wavelength range of ($\lambda_{CH} - \lambda_i \times 0.375/2$) or more but ($\lambda_{CH} + \lambda_i \times 0.375/2$) or less, where $\lambda_{CH}$ is a center wavelength of each signal channel. An absolute value of a chromatic dispersion of each of the M channels in the reflection band, which is caused by reflection in the grating 113, is preferably 0.8 ps/nm or less in the above wavelength range.

Figure 2:
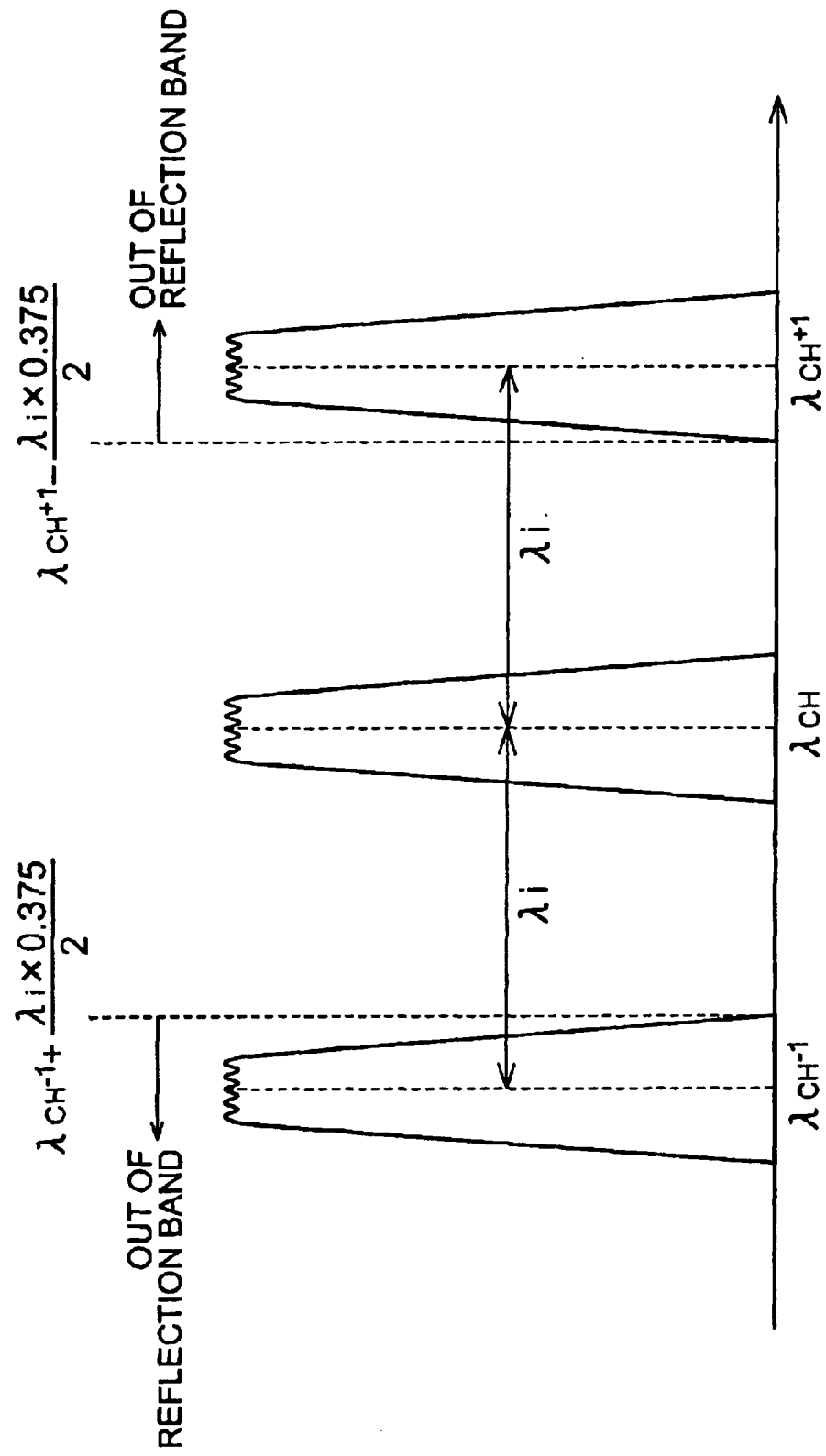
FIG. 2 is a diagram for explaining the regions outside the reflection band in the optical waveguide type grating element according to the present invention.
Figure 3A:
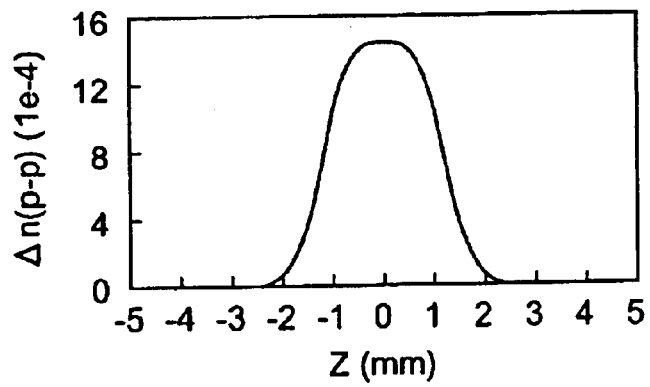
FIGS. 3A–3D are graphs showing various characteristics at each signal channel wavelength as to first design example A of the optical waveguide type grating element in the first embodiment.
Figure 3B:
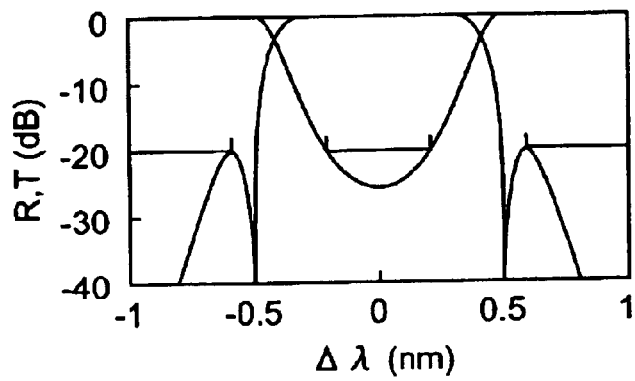
Figure 3C:
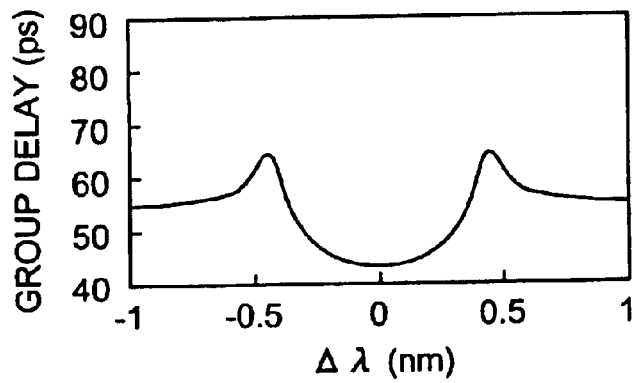
Figure 3D:
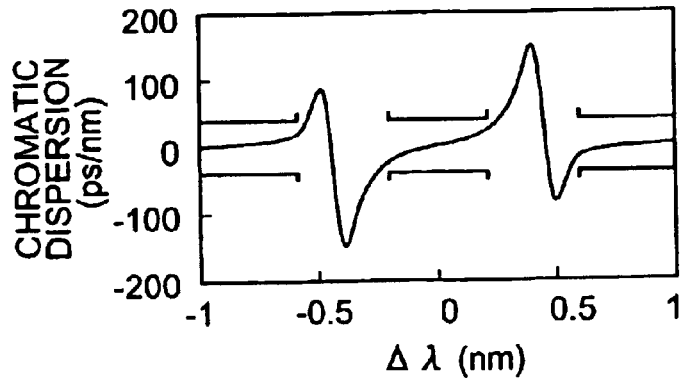
Figure 4A:
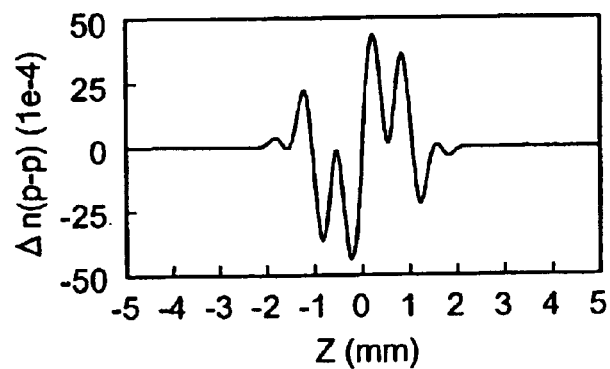
FIGS. 4A–4D are graphs showing various characteristics in the case of 4-channel superposition as to first design example A of the optical waveguide type grating element in the first embodiment.
Figure 4B:
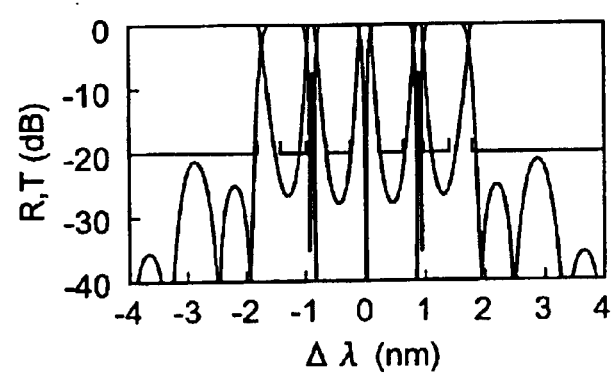
Figure 4C:
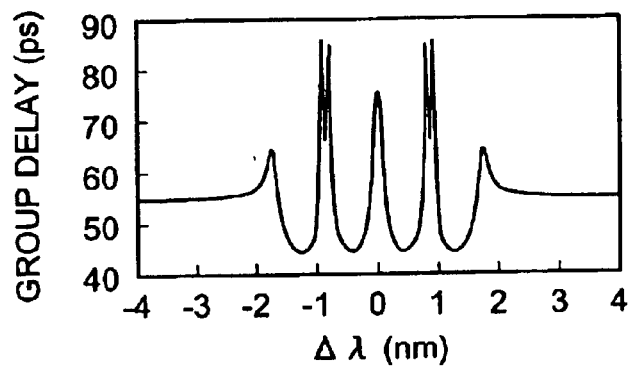
Figure 4D:
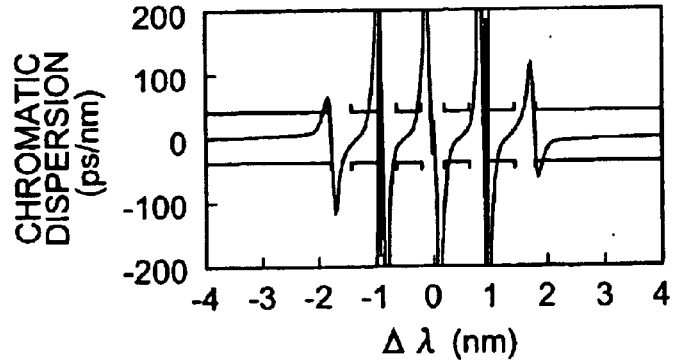
Figure 5A:
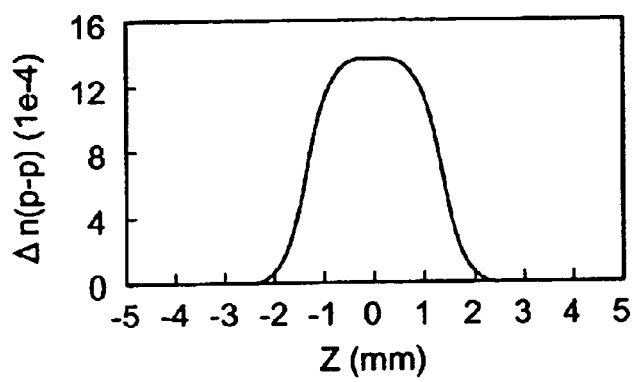
FIGS. 5A–5D are graphs showing various characteristics at each signal channel wavelength as to first design example B of the optical waveguide type grating element in the first embodiment.
Figure 5B:
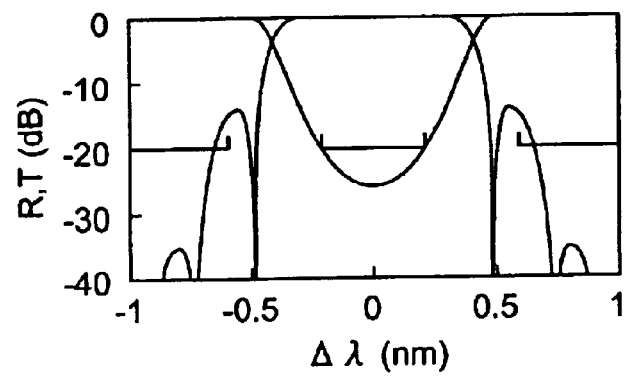
Figure 5C:
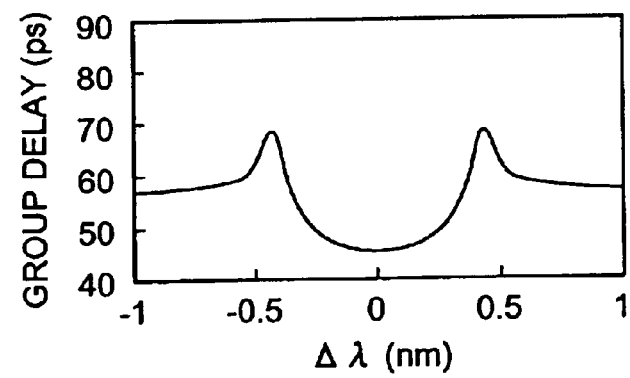
Figure 5D:
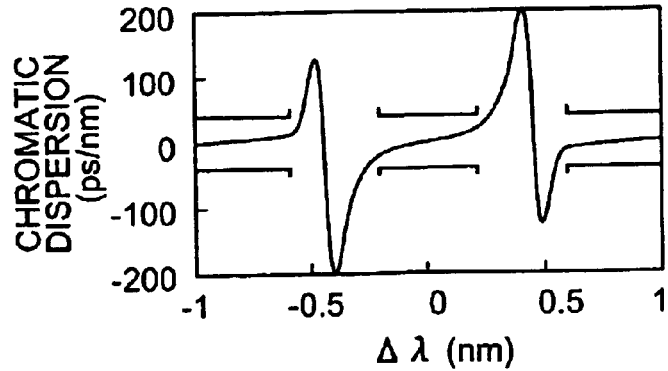
Figure 6A:
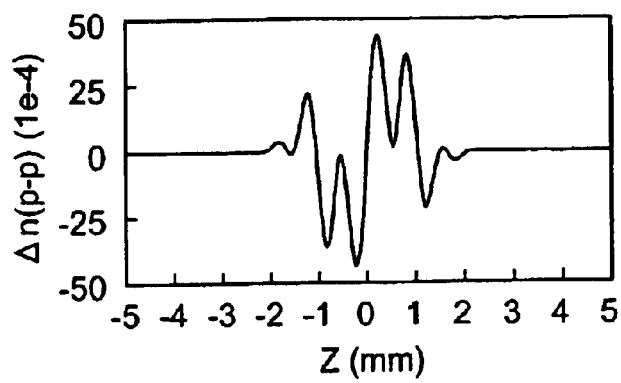
FIGS. 6A–6D are graphs showing various characteristics in the case of 4-channel superposition as to first design example B of the optical waveguide type grating element in the first embodiment.
Figure 6B:
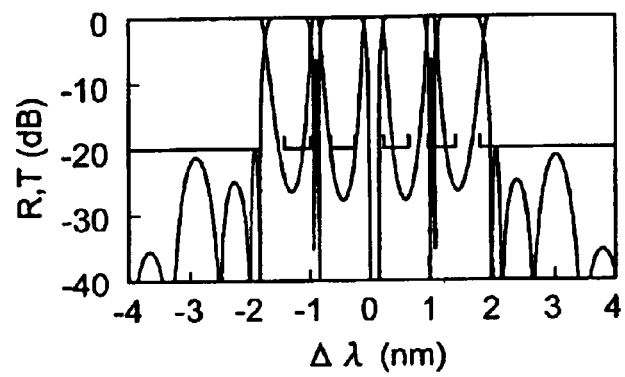
Figure 6C:
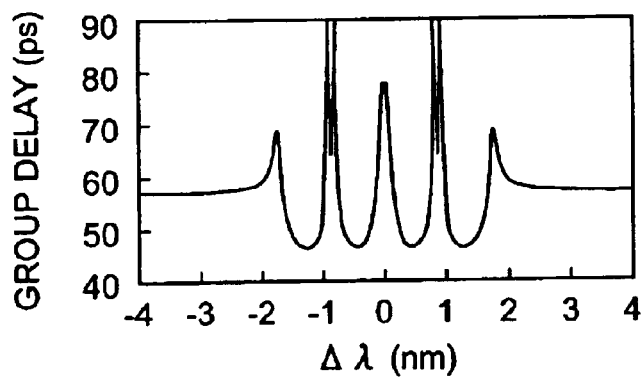
Figure 6D:
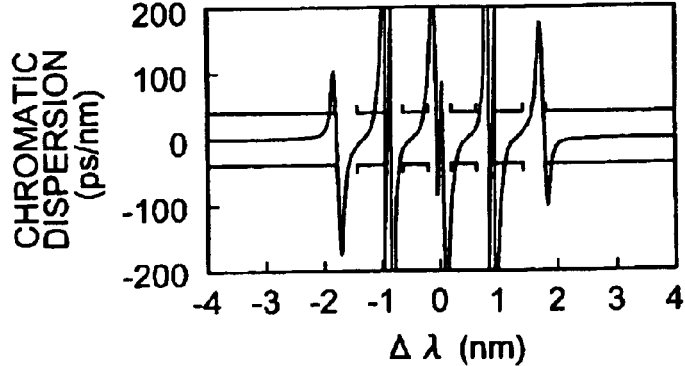

A reflection band for a signal channel of a center wavelength $\lambda_{CH}$ among the signal channels spaced at the channel spacing $\lambda_i$ is given by the wavelength range of ($\lambda_{CH} - \lambda_i \times 0.375/2$) or more but ($\lambda_{CH} + \lambda_i \times 0.375/2$) or less as described above. On the other hand, the regions outside the reflection band are defined by bands where signal channels adjacent to a signal channel to be reflected are present, as shown in FIG. 2; for example, where a signal channel of a center wavelength $\lambda_{CH+1}$ and a signal channel of a center wavelength $\lambda_{CH-1}$ are adjacent on the long wavelength side and on the short wavelength side, respectively, to the signal channel of the center wavelength $\lambda_{CH}$, a wavelength range of ($\lambda_{CH-1} + \lambda_i \times 0.375/2$) or less and a wavelength range of ($\lambda_{CH+1} - \lambda_i \times 0.375/2$) or more correspond to the regions outside the reflection band for the signal channel of the center wavelength $\lambda_{CH}$.

The optical waveguide type grating element 100 of the configuration as described above can be constructed in compact scale, because the grating 113 is formed in one portion thereof. This optical waveguide type grating element 100 is able to selectively reflect each of the M channels in the reflection band with high reflectance and transmit each of the signal channels outside the reflection band with high transmittance. In addition, the optical waveguide type grating element 100 brings only the small chromatic dispersion in the selective reflection of each of the M channels in the reflection band.

In the optical waveguide type grating element 100, the amplitude profile of the index modulation formed over the predetermined range preferably has a phase inverted portion. In this case, it becomes feasible to realize the optical waveguide type grating element 100 with various characteristics (e.g., the deviation of the group delay time and the chromatic dispersion) as described above. In the optical waveguide type grating element 100, absolute values of amplitudes of the index modulation formed over the predetermined range are preferably symmetric with respect to the center of the predetermined range. In this case, an optical ADM can be constructed by use of only one optical waveguide type grating element 100. Furthermore, in the optical waveguide type grating element 100, transmittances for the respective signal channels in the reflection band are preferably different from each other, and a transmittance for a signal channel of a shortest wavelength or for a signal channel of a longest wavelength out of the signal channels in the reflection band is preferably different from a transmittance for the center wavelength of the reflection band. In this case, it is easy to control the reflectance for each signal channel outside the reflection band at a low level. It is also easy to control the group delay variation in the reflection band at a low level.

(First Embodiment of Optical Waveguide Type Grating Element)

Specific design examples of the first embodiment of the optical waveguide type grating element according to the present invention will be described below. It is assumed in the specific design examples of the first embodiment that the signal light injected into the optical waveguide type grating element is 1.55 μm-band signal light in which a plurality of signal channels spaced at the optical frequency spacing of 100 GHz (channel spacing $\lambda_i = 0.8$ nm) are multiplexed (multiplexed signal light) and that the optical waveguide type grating element selectively reflects four consecutive signal channels among them. It is further supposed that the band where the transmittance is −20 dB or less (the range of the group delay variation) is the range of ±0.21 nm (each reflection bandwidth being 0.30 nm) for the center wavelength of each of the above four signal channels. In the description hereinafter, the center wavelength of the whole of the above four signal channels is represented by $\lambda_0$.

In first design examples A and B, gratings of the four index modulation periods with a fixed period difference are superimposed corresponding to the four signal channels ($\lambda_0 − 1.2$ nm, $\lambda_0 − 0.4$ nm, $\lambda_0 + 0.4$ nm, and $\lambda_0 + 1.2$ nm) in the respective reflection bands. In this case, the reflection bandwidth set for each signal channel is 0.30 nm (the range of ±0.15 nm centered about the center wavelength) and a ratio of the reflection bandwidth to the channel spacing is 0.375. These index modulation periods are optimized by nonlinear programming so as to minimize the transmittance in the reflection band, the reflectance outside the reflection band, and the chromatic dispersion at the reflected wavelengths. FIGS. 3A–3D are graphs showing various characteristics at each signal channel wavelength in the first design example A, and FIGS. 4A–4D are graphs showing various characteristics in the case of 4-channel wavelength superposition in the first design example A. FIGS. 5A–5D are graphs showing various characteristics at each signal channel wavelength in the other first design example B, and FIGS. 6A–6D are graphs showing various characteristics in the case of 4-channel superposition in the first design example B. Each of FIGS. 3A, 4A, 5A, and 6A shows the amplitude profile Δn of the index modulation, each of FIGS. 3B, 4B, 5B, and 6B the wavelength dependences of transmittance T and reflectance R, each of FIGS. 3C, 4C, 5C, and 6C the wavelength dependence of the group delay time in the reflection, and each of FIGS. 3D, 4D, 5D, and 6D the wavelength dependence of the chromatic dispersion in the reflection. As seen from these graphs, in each of the first design examples A, B, the four channels in the reflection band were different from the target values, and the channel spacings between the signal channels became wider with increase in the difference from the center wavelength $\lambda_0$. For this reason, the maximum chromatic dispersion in each reflection band took a value as large as over 300 ps/nm.

Figure 7A:
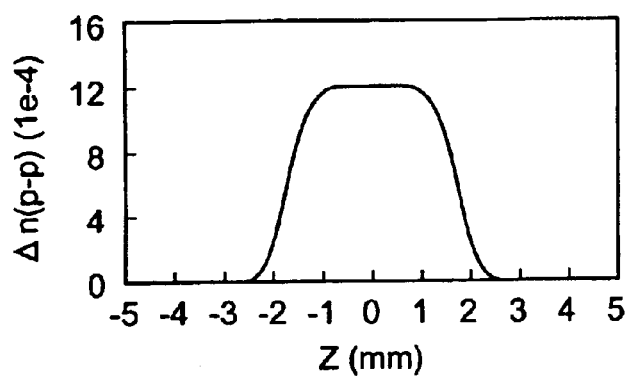
FIGS. 7A–7D are graphs showing various characteristics about two channels at the both ends of the reflection band as to a second design example of the optical waveguide type grating element in the first embodiment.
Figure 7B:
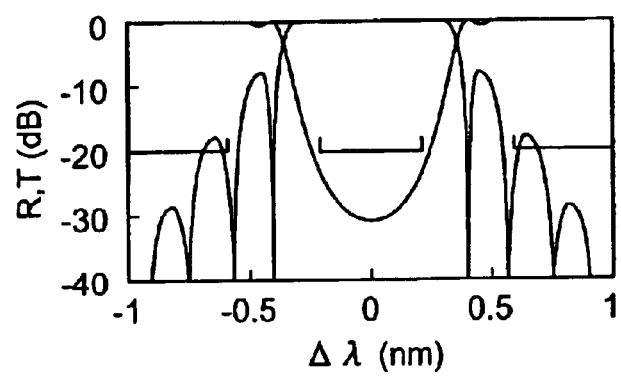
Figure 7C:
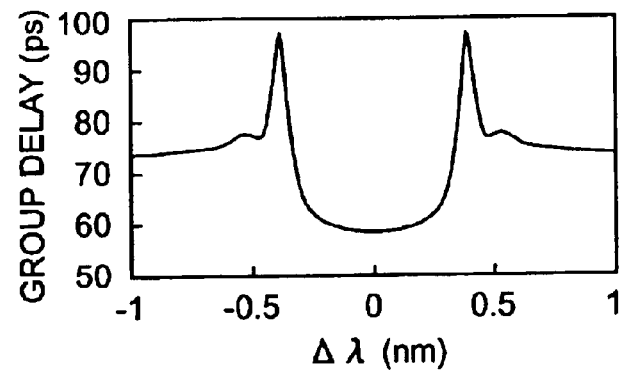
Figure 7D:
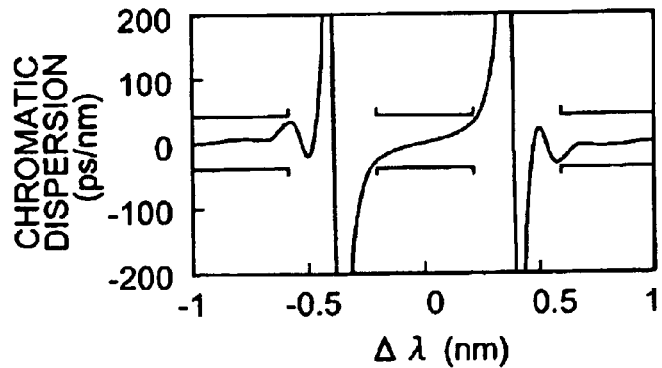
Figure 8A:
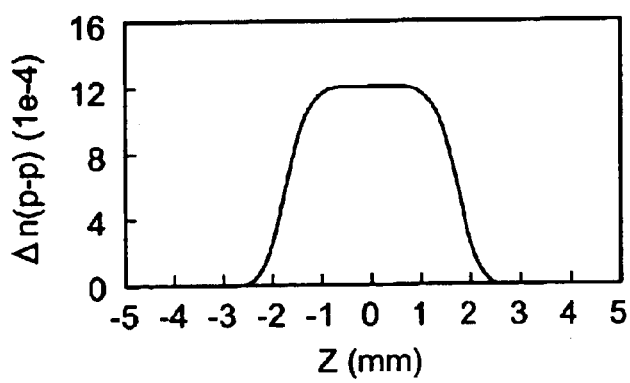
FIGS. 8A–8D are graphs showing various characteristics about two center channels as to the second design example of the optical waveguide type grating element in the first embodiment.
Figure 8B:
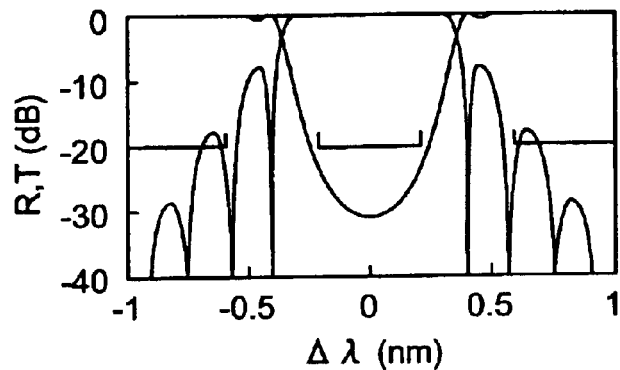
Figure 8C:
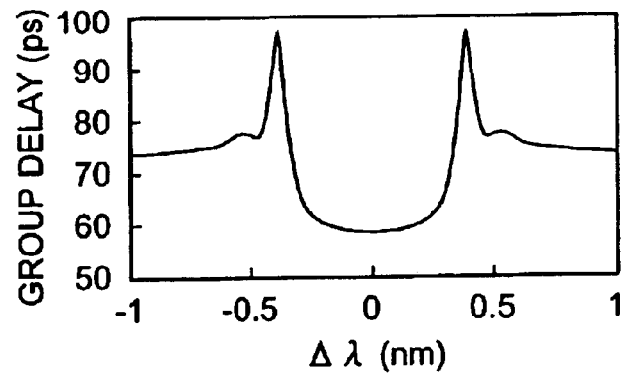
Figure 8D:
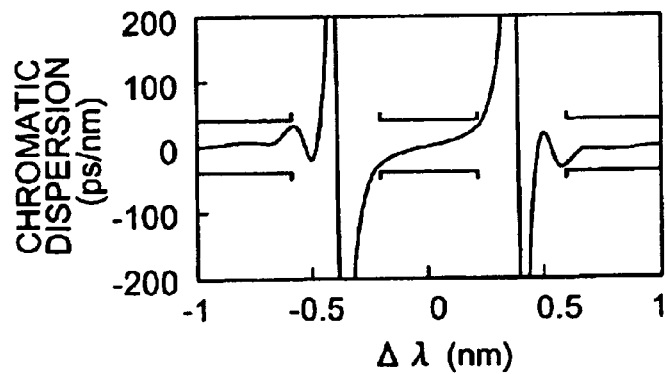
Figure 9A:
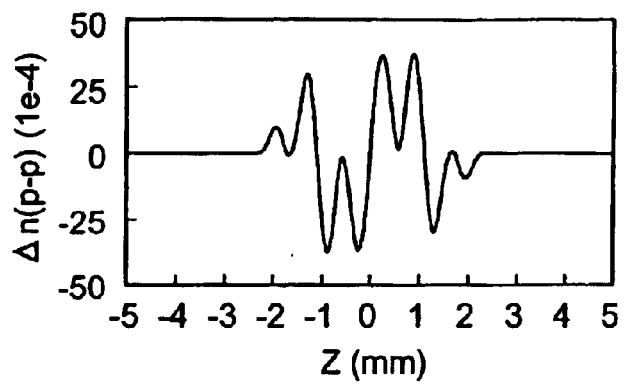
FIGS. 9A–9D are graphs showing various characteristics in the case of 4-channel superposition as to the second design example of the optical waveguide type grating element in the first embodiment.
Figure 9B:
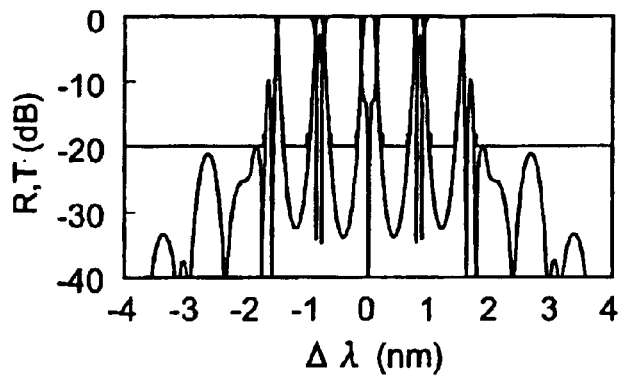
Figure 9C:
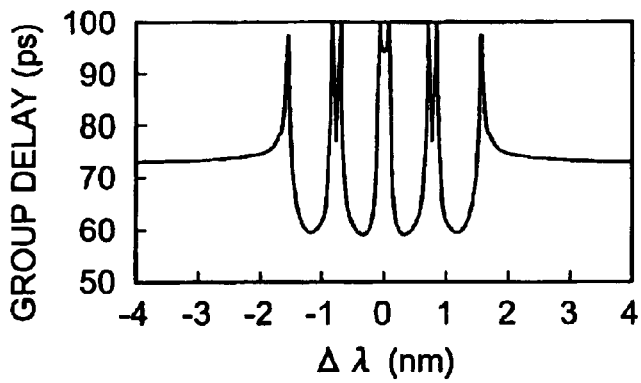
Figure 9D:
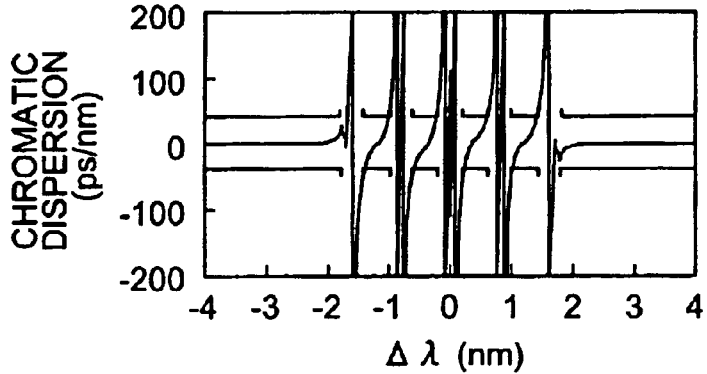

In the second design example, the index modulation periods for the four gratings superimposed are not defined with a fixed period difference, and the index modulation periods are optimized for the two channels located in the center ($\lambda_0-0.4$ nm and $\lambda_0+0.4$ nm) and for the two channels located on the both sides ($\lambda_0-1.2$ nm and $\lambda_0+1.2$ nm). FIGS. 7A–7D are graphs showing various characteristics about the two channels on the both sides in the second design example, FIGS. 8A–8D graphs showing various characteristics about the two channels in the center in the second design example, and FIGS. 9A–9D graphs showing various characteristics in the case of 4-channel superposition in the second design example. Each of FIGS. 7A, 8A, and 9A shows the amplitude profile An of the index modulation, each of FIGS. 7B, 8B, and 9B the wavelength dependences of transmittance T and reflectance R, each of FIGS. 7C, 8C, and 9C the wavelength dependence of the group delay time in the reflection, and each of FIGS. 7D, 8D, and 9D the wavelength dependence of the chromatic dispersion in the reflection. As seen from these graphs, in the second design example, the four channels in the reflection band were approximately equal to the target values, and the maximum chromatic dispersion in each reflection band was 49.8 ps/nm.

Figure 10A:
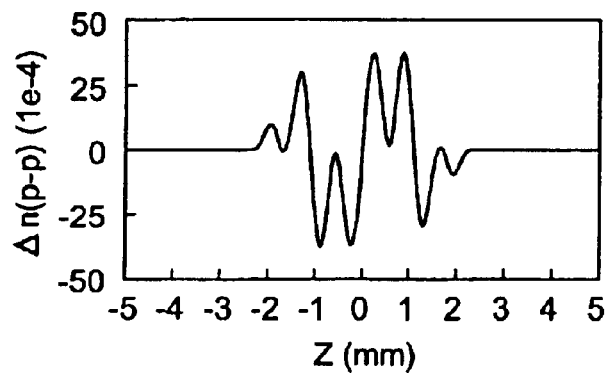
FIGS. 10A–10D are graphs showing various characteristics about two channels at the both ends of the reflection band as to a third design example of the optical waveguide type grating element in the first embodiment.
Figure 10B:
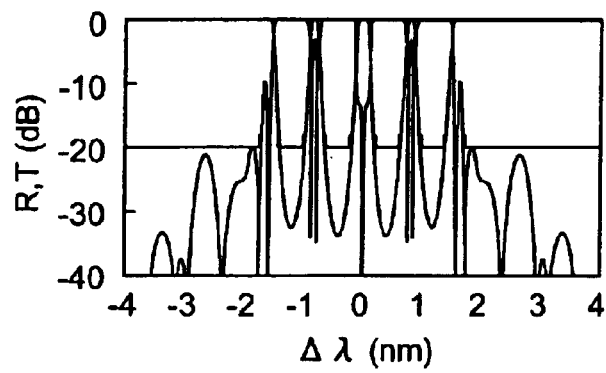
Figure 10C:
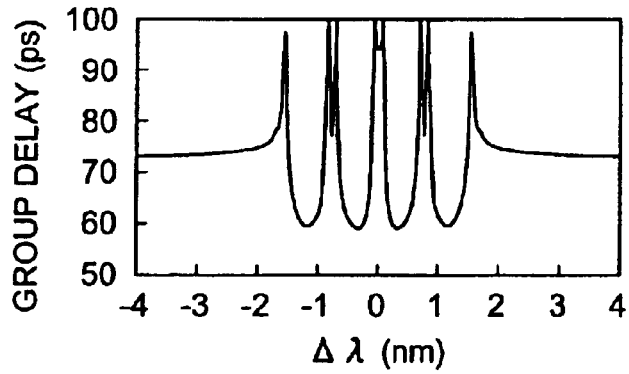
Figure 10D:
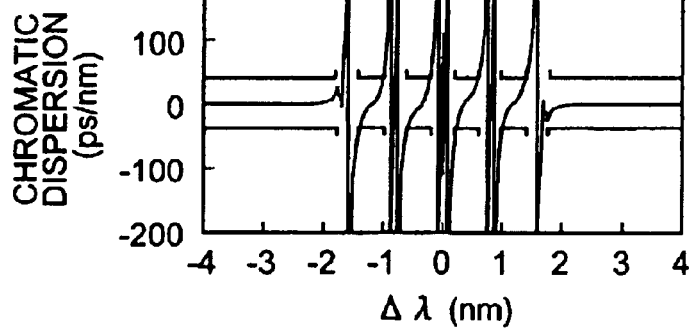
Figure 11A:
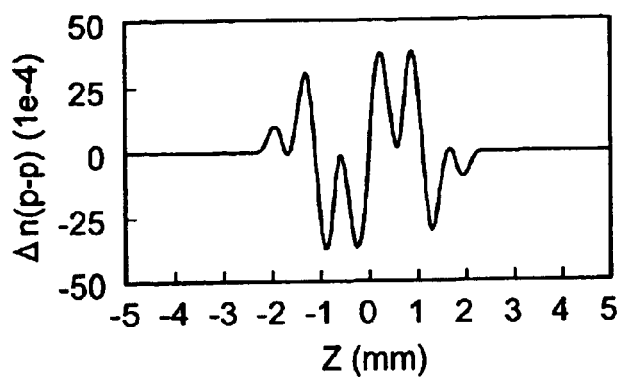
FIGS. 11A–11D are graphs showing various characteristics about two center channels as to the third design example of the optical waveguide type grating element in the first embodiment.
Figure 11B:
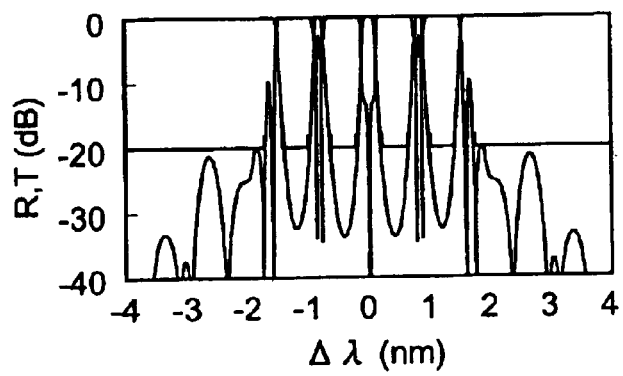
Figure 11C:
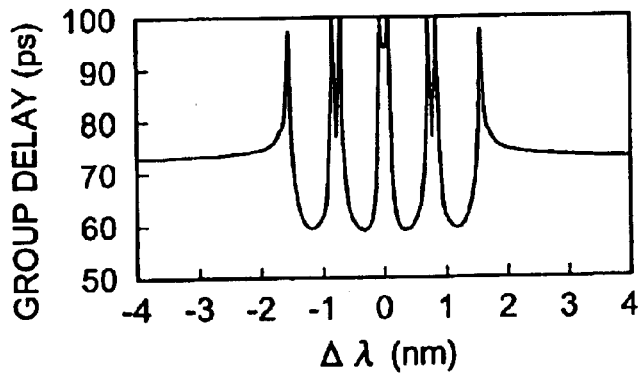
Figure 11D:
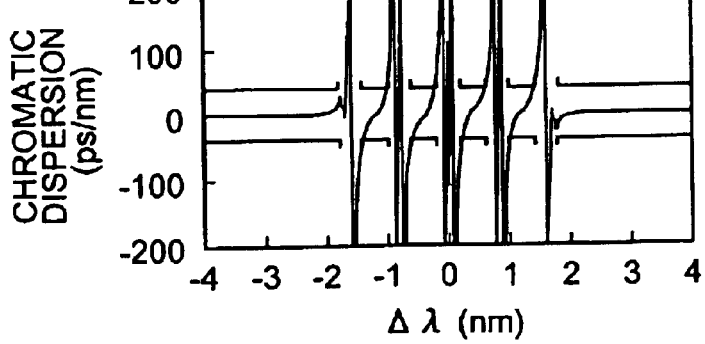
Figure 12A:
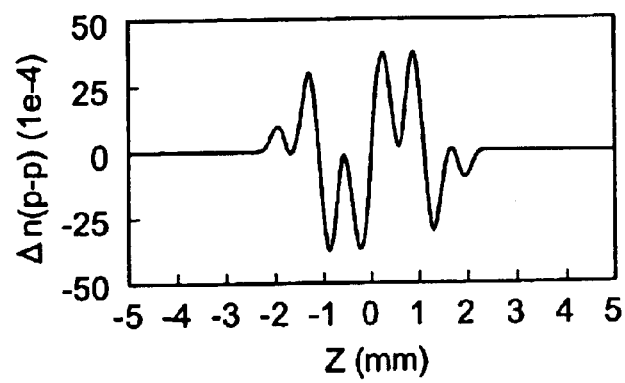
FIGS. 12A–12D are graphs showing various characteristics in the case of 4-channel superposition as to the third design example of the optical waveguide type grating element in the first embodiment.
Figure 12B:
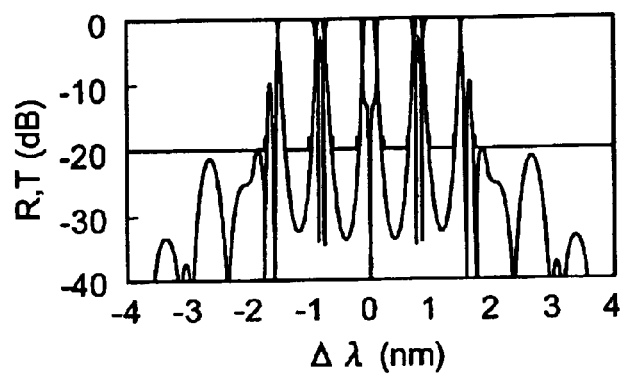
Figure 12C:
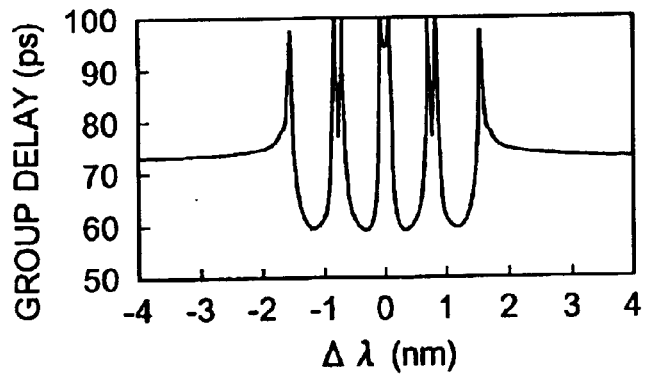
Figure 12D:
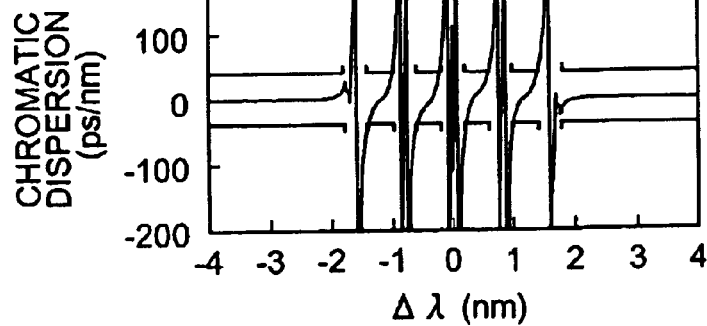

In the third design example, the index modulation periods of the four gratings superimposed are not defined with a fixed period difference, and the index modulation periods are individually optimized for the two channels located in the center ($\lambda_0-0.4$ nm and $\lambda_0+0.4$ nm) and for the two channels located on the both sides ($\lambda_0-1.2$ nm and $\lambda_0+1.2$ nm). FIGS. 10A–10D are graphs showing various characteristics for the two channels on the both sides in the third design example, FIGS. 11A–11D graphs showing various characteristics about the two channels in the center in the third design example, and FIGS. 12A–12D graphs showing various characteristics in the case of 4-channel superposition in the third design example. Each of FIGS. 10A, 11A, and 12A shows the amplitude profile An of the index modulation, each of FIGS. 10B, 11B, and 12B the wavelength dependences of transmittance T and reflectance R, each of FIGS. 10C, 10C, and 12C the wavelength dependence of the group delay time in the reflection, and each of FIGS. 10D, 10D, and 12D the wavelength dependence of the chromatic dispersion in the reflection. As seen from these graphs, in the third design example, the four channels in the reflection band were approximately equal to the target values, and the maximum chromatic dispersion in each reflection band was 14.4 ps/nm.

Figure 13A:
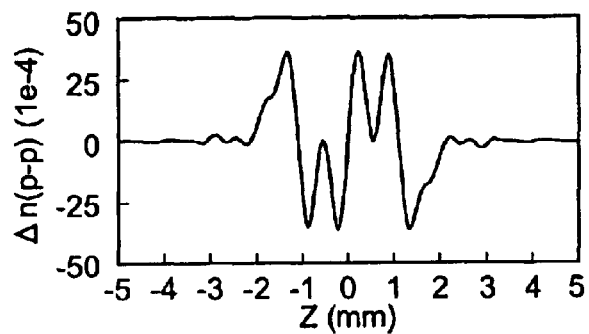
FIGS. 13A–13E are graphs showing various characteristics in the case of 4-channel superposition as to a fourth design example of the optical waveguide type grating element in the first embodiment.
Figure 13B:
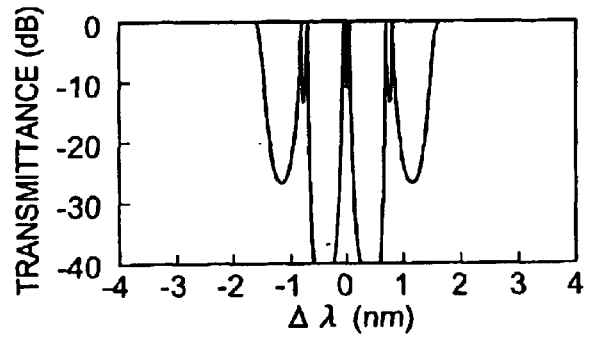
Figure 13C:
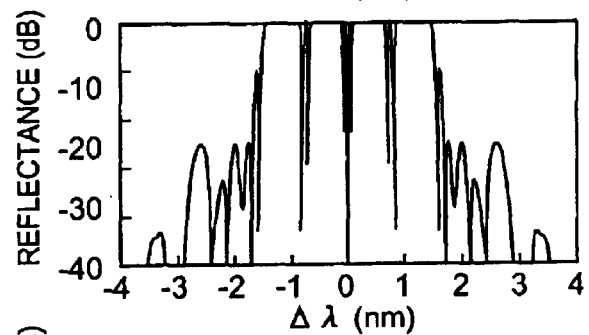
Figure 13D:
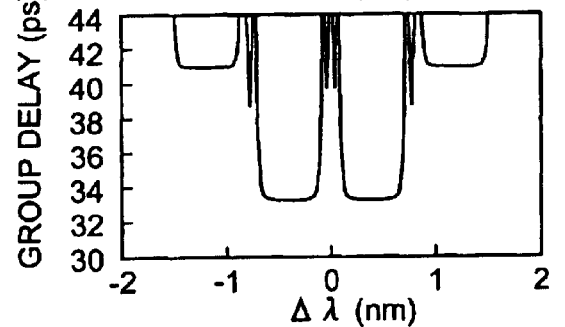
Figure 13E:
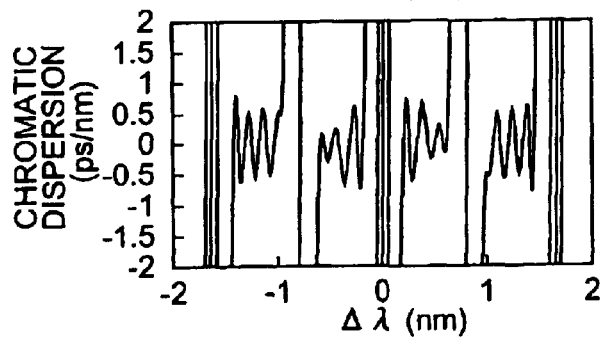

In the fourth design example, the index modulation periods are optimized by nonlinear programming so as to minimize the transmittance in the reflection band, the reflectance outside the reflection band, and the chromatic dispersion at the reflected wavelengths, based on Eqs (2a) and (2b) above. FIGS. 13A–13E are graphs showing various characteristics in the case of 4-channel superposition in the fourth design example. FIG. 13A shows the amplitude profile Δn of the index modulation, FIG. 13B the wavelength dependence of transmittance T, FIG. 13C the wavelength dependence of reflectance R, FIG. 13D the wavelength dependence of the group delay time in the reflection, and FIG. 13E the wavelength dependence of the chromatic dispersion in the reflection. As seen from these graphs, in the fourth design example, the amplitude profile of the index modulation had phase inverted portions, the four channels in the reflection band were approximately equal to the target values, the maximum absolute value of the chromatic dispersion in each reflection band was 0.8 ps/nm or less, and the deviation of the group delay time in each reflection band was 0.05 ps or less. The optical waveguide type grating element according to the fourth design example has the characteristics applicable to communication at high transmission rates.

The optical waveguide type grating elements of the first to fourth design examples designed as described above were actually fabricated and evaluated, and they demonstrated characteristics almost equal to the designed characteristics in the reflection bandwidth equivalent to that designed. The reflectance outside the reflection band was −15 dB or less, and the deviation of the group delay time in the reflection of each signal in the reflection band was 5 ps or less.

It was assumed in the above-described first to fourth design examples of the first embodiment that the multiplexed signal light in the 1.55 μm wavelength band in which the plurality of signal channels with the optical frequency spacing of 100 GHz (the wavelength spacing of 0.8 nm) were multiplexed was injected into the optical waveguide type grating element and that the four consecutive signal channels among them were selectively reflected by the optical waveguide type grating element. However, the optical waveguide type grating element does not have to be limited to this assumption, but it can also be applied to cases where the optical frequency spacing is 50 GHz and cases where the number of signal channel waves reflected is much greater. It was also assumed in the above first to fourth design examples that the reflection band with the transmittance of −20 dB or less was the range of ±0.21 nm with respect to each center wavelength, but the reflection band can be defined as the case may be; where the optical frequency spacing is 100 GHz (the channel spacing of 0.8 nm), the reflection band can be the range of ±0.15 nm with respect to each center wavelength (the ratio of each reflection bandwidth to the channel spacing being 0.375); and where the optical frequency spacing is 50 GHz (the channel spacing of 0.4 nm), the reflection band can be the range of ±0.08 nm with respect to each center wavelength (the ratio of each reflection bandwidth to the channel spacing is 0.4).

(Second Embodiment of Optical Waveguide Type Grating Element)

Specific design examples of the second embodiment of the optical waveguide type grating element according to the present invention will be described below. It is assumed in the specific design examples of the second embodiment that the signal light injected into the optical waveguide type grating element is 1.55 μm-band signal light in which a plurality of signal channels spaced at the optical frequency spacing of 50 GHz (channel spacing $\lambda_i=0.4$ nm) are multiplexed (multiplexed signal light) and that the optical waveguide type grating element selectively reflects four consecutive signal channels among them. It is further supposed that the band where the transmittance is −20 dB or less (the range of the group delay variation) is the range of ±0.105 nm for each center wavelength of the above four signal channels. In the description hereinafter, the center wavelength of the whole of the above four signal channels is represented by $\lambda_0$.

Figure 14A:
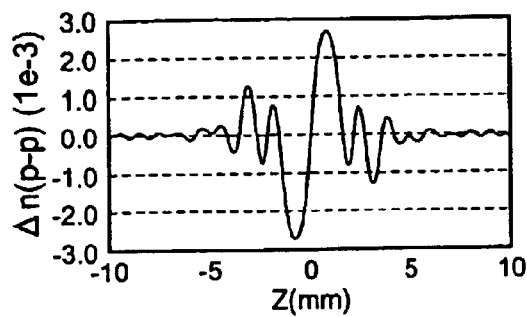
FIGS. 14A–14E are graphs showing various characteristics in the case of 4-channel superposition as to a first design example of the optical waveguide type grating element in the second embodiment.
Figure 14B:
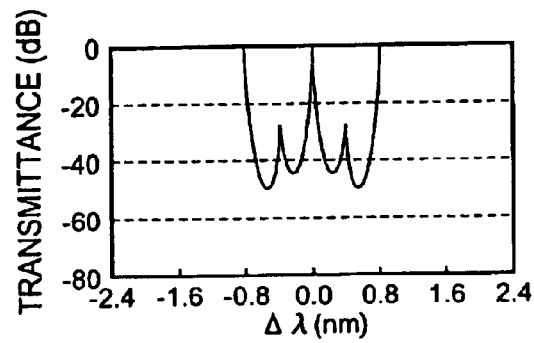
Figure 14C:
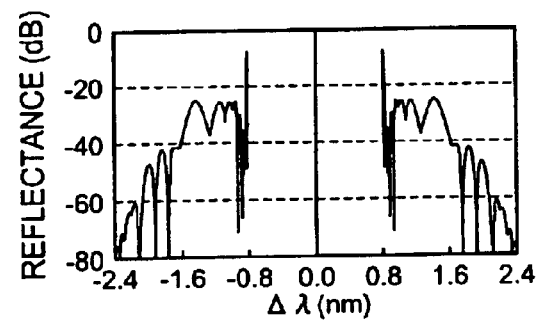
Figure 14D:
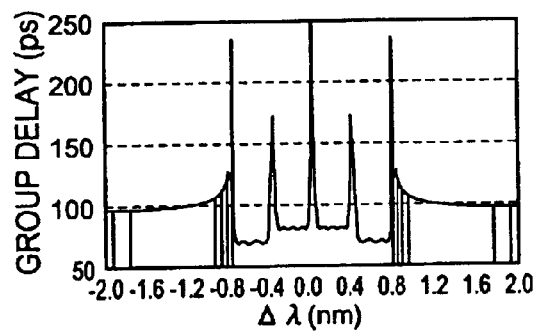
Figure 14E:
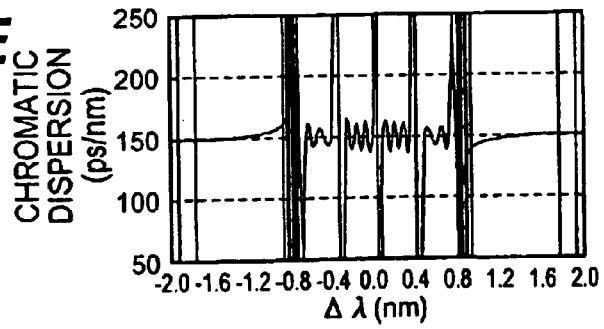

Gratings of the four index modulation periods with a fixed period difference are superimposed corresponding to the four signal channels ($\lambda_0$−0.6 nm, $\lambda_0$−0.2 nm, $\lambda_0$+0.2 nm, and $\lambda_0$+0.6 nm) in the respective reflection bands. In this case, the reflection bandwidth set for each signal channel is 0.15 nm (the range of ±0.075 nm centered about the center wavelength) and the ratio of the reflection bandwidth to the channel spacing is 0.375. These index modulation periods are optimized by nonlinear programming so as to minimize the transmittance in the reflection band, the reflectance outside the reflection band, and the chromatic dispersion at the reflected wavelengths. FIGS. 14A–14E are graphs showing various characteristics at each signal channel wavelength in the first design example, wherein FIG. 14A shows the amplitude profile Δn of the index modulation, FIG. 14B the wavelength dependence of transmittance T, FIG. 14C the wavelength dependence of reflectance R, FIG. 14D the wavelength dependence of the group delay time in the reflection, and FIG. 14E the wavelength dependence of the chromatic dispersion in the reflection. In the first design example of the second embodiment, the group delay time in each reflection band (0.15 nm) was 1.65 ps.

Figure 15A:
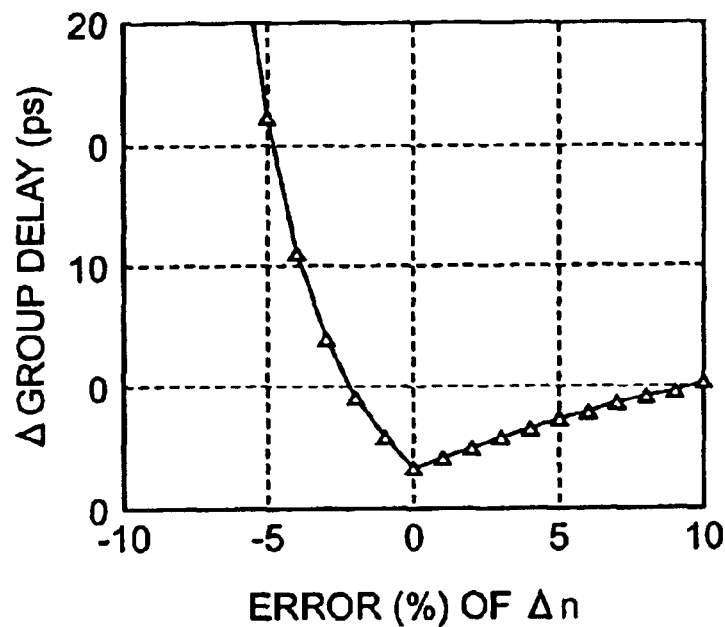
FIGS. 15A and 15B are graphs showing the group delay characteristic and reflection characteristic of the optical waveguide type grating element shown in FIGS. 14A–14D (the first design example of the second embodiment)
Figure 15B:
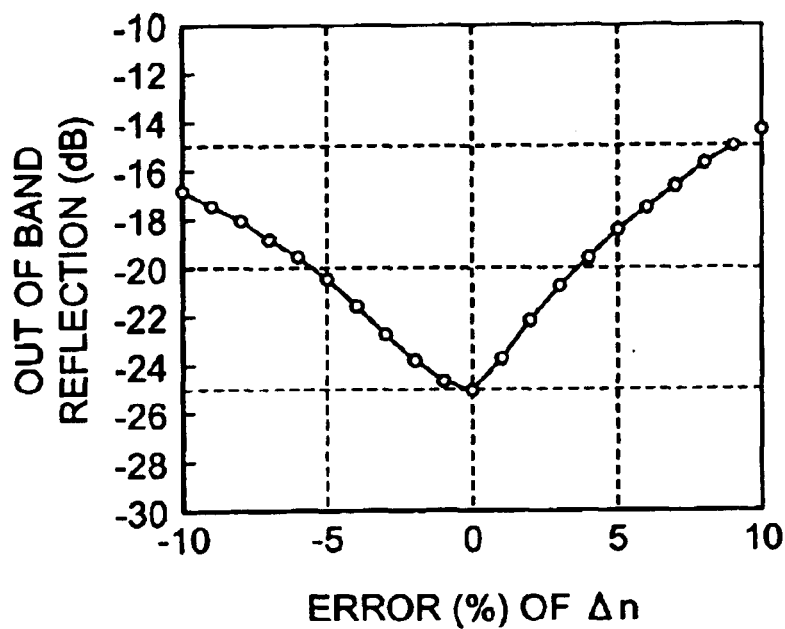

The group delay characteristic of the optical waveguide type grating element according to the above first design example is one obtained when the index profile Δn of the index modulation just equals the designed values. In practical production, there occurs the difference in resolution of control of laser irradiation amounts and, specifically, there is error in the number of scans in multi-scan operation, resulting in failure in achieving the as-designed index modulation amounts. FIGS. 15A and 15B are graphs showing the relationship between the group delay characteristic and error of Δn and the relationship between the reflection characteristic outside the reflection band and error of Δn in the first design example of the second embodiment. As seen from these graphs, in the first design example of the second embodiment, the group delay characteristic of 10 ps or less and the reflectance of −20 dB or less are achieved in a state in which Δn is close to the designed value, but these characteristics are not met if Δn has the error over about ±5%.

Figure 16A:
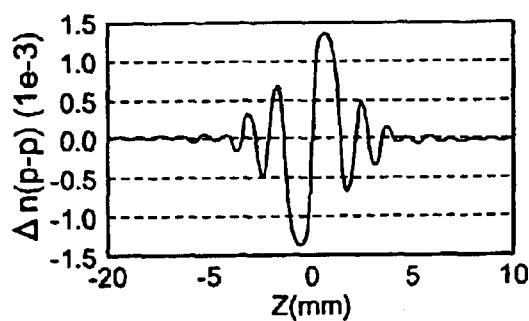
FIGS. 16A–16E are graphs showing various characteristics in the case of 4-channel superposition as to a second design example of the optical waveguide type grating element in the second embodiment (an improvement example of the first design example shown in FIGS. 14A–14E)
Figure 16B:
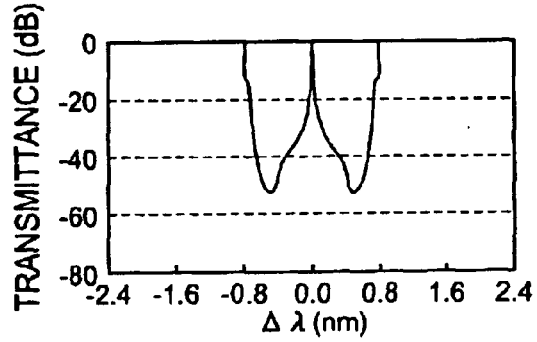
Figure 16C:
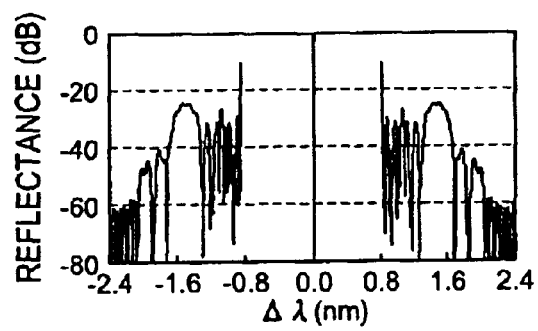
Figure 16D:
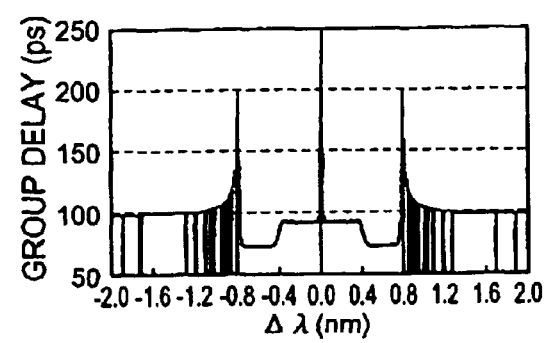
Figure 16E:
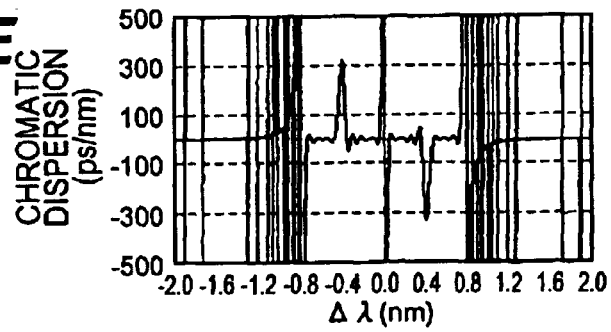
Figure 17A:
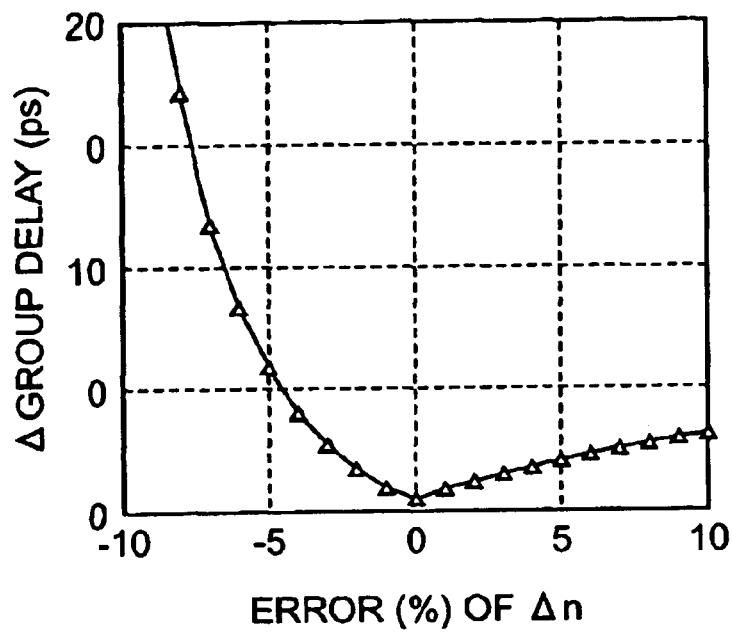
FIGS. 17A and 17B are graphs showing the group delay characteristic and reflection characteristic of the optical waveguide type grating element shown in FIGS. 16A–16D (the second design example of the second embodiment)
Figure 17B:
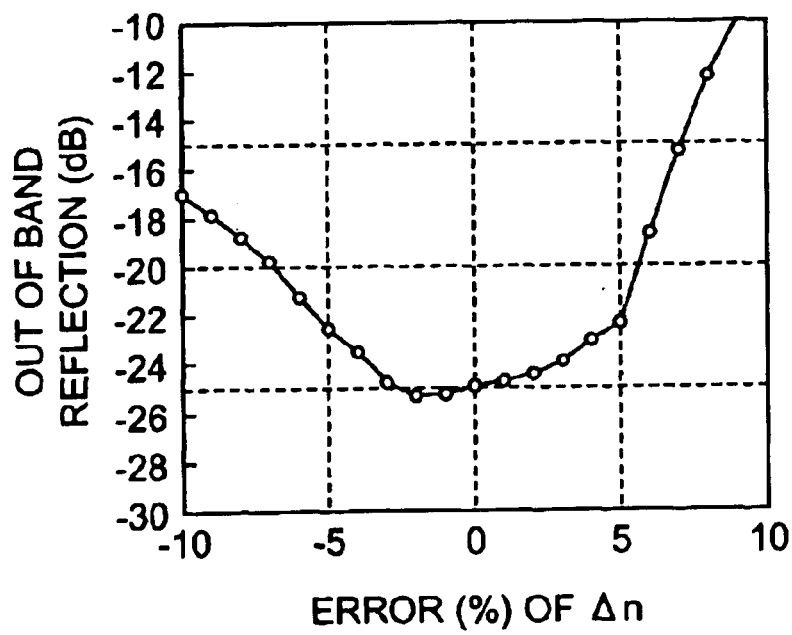

In the production of the optical waveguide type grating element, therefore, the index modulation periods and the amplitude profile of the index modulation need to be designed with allowance for manufacturing error so as to achieve sufficient control over the variation of index modulation amounts. The second design example below is designed to achieve the desired characteristics even with the error of Δn of about ±5% as a modification of the above first design example (FIGS. 16A–16E). FIG. 16A shows the amplitude profile Δn of the index modulation, FIG. 16B the wavelength dependence of transmittance T, FIG. 16C the wavelength dependence of reflectance R, FIG. 16D the wavelength dependence of the group delay time in the reflection, and FIG. 16E the wavelength dependence of the chromatic dispersion in the reflection. In the second design example of the second embodiment, the group delay characteristic and the chromatic dispersion characteristic are such that the group delay characteristic of 10 ps or less and the reflectance of −20 dB or less are obtained even with the error of Δn being as large as about ±5%, as shown in FIGS. 17A and 17B. FIGS. 17A and 17B are graphs showing the relationship between the group delay characteristic and error of Δn and the relationship between the reflection characteristic outside the reflection band and error of Δn in the second design example of the second embodiment.

(Third Embodiment of Optical Waveguide Type Grating Element)

Furthermore, a specific design example of the third embodiment of the optical waveguide type grating element according to the present invention is configured on the assumption that the signal light injected into the optical waveguide type grating element is 1.55 μm-band signal light in which a plurality of signal channels spaced at the optical frequency spacing of 25 GHz (channel spacing $\lambda_i$=0.2 nm) are multiplexed (multiplexed signal light) and that the optical waveguide type grating element selectively reflects four consecutive signal channels among them. It is further supposed that the band where the transmittance is −20 dB or less (the range of the group delay variation) is the range of ±0.0525 nm for each center wavelength of the above four signal channels. In the description hereinafter, the center wavelength of the whole of the above four signal channels is represented by $\lambda_0$.

Figure 18A:
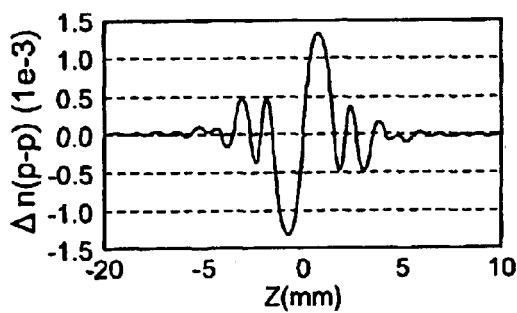
FIGS. 18A–18E are graphs showing various characteristics in the case of 4-channel superposition as to the optical waveguide type grating element in the third embodiment.
Figure 18B:
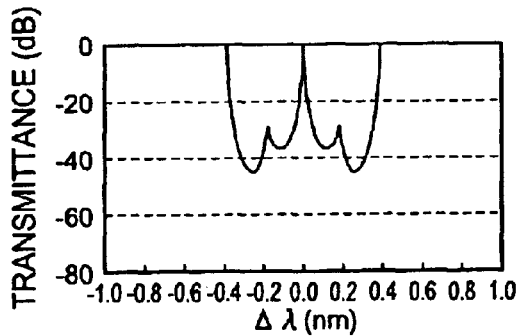
Figure 18C:
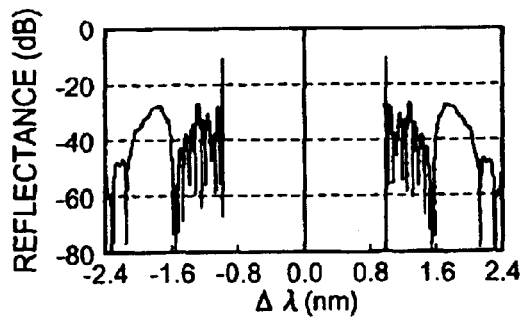
Figure 18D:
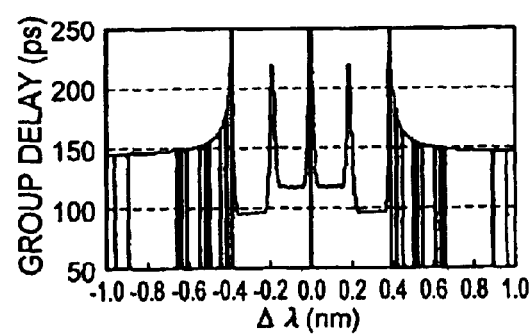
Figure 18E:
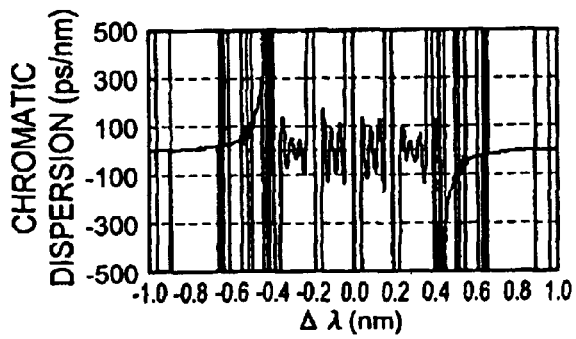

Gratings of the four index modulation periods with a fixed period difference are superimposed corresponding to the four signal channels ($\lambda_0$−0.3 nm, $\lambda_0$−0.1 nm, $\lambda_0$+0.1 nm, and $\lambda_0$+0.3 nm) in the respective reflection bands. In this case, the reflection bandwidth set for each signal channel is 0.075 nm (the range of ±0.0375 nm centered about the center wavelength) and the ratio of the reflection bandwidth to the channel spacing is 0.375. These index modulation periods are optimized by nonlinear programming so as to minimize the transmittance in the reflection band, the reflectance outside the reflection band, and the chromatic dispersion at the reflected wavelengths. FIGS. 18A–18E are graphs showing various characteristics at each signal channel wavelength in the design example of the third embodiment, wherein FIG. 18A shows the amplitude profile Δn of the index modulation, FIG. 18B the wavelength dependence of transmittance T, FIG. 18C the wavelength dependence of reflectance R, FIG. 18D the wavelength dependence of the group delay time in the reflection, and FIG. 18E the wavelength dependence of the chromatic dispersion in the reflection. In the design example of the third embodiment, the group delay time in each reflection band (0.075 nm) was 1.81 ps.

An embodiment of the multiplexer/demultiplexer module according to the present invention will be described below. The multiplexer/demultiplexer module 10 described below is an optical device incorporating the optical waveguide type grating element 100 of the structure as described above (the optical waveguide type grating element according to the present invention). In the description hereinafter, it is assumed that the signal light is one in which M signal channels (wavelengths $\lambda_1$–$\lambda_M$) are multiplexed and that the optical waveguide type grating element 100 selectively reflects each of four consecutive signal channels $\lambda_{m1}$–$\lambda_{m4}$ among them.

Figure 19:
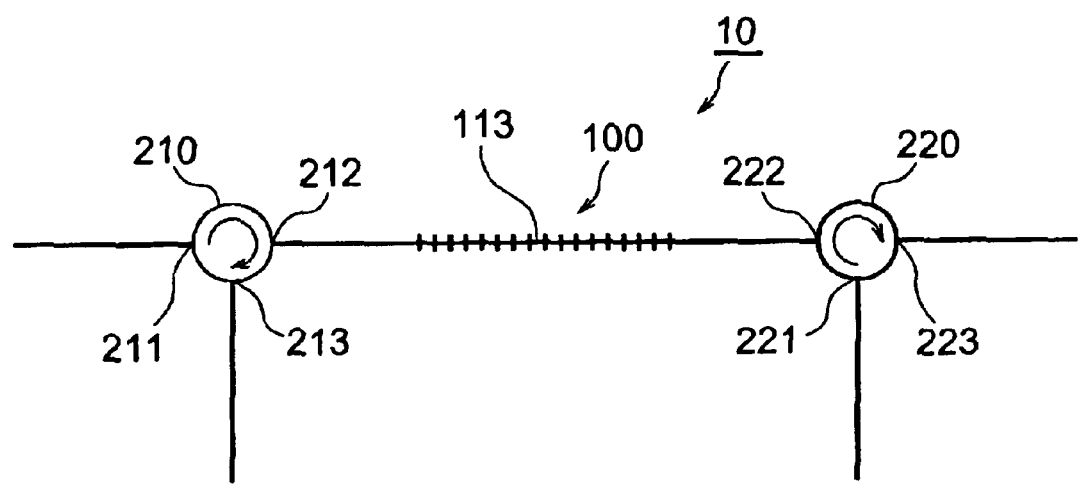
FIG. 19 is a diagram showing a configuration of a multiplexer/demultiplexer module according to the present invention.

FIG. 19 is a diagram showing the structure of an embodiment of the multiplexer/demultiplexer module 10 according to the present invention. This multiplexer/demultiplexer module 10 has the structure wherein optical circulator 210 is connected to one end of the optical waveguide type grating element 100 while optical circulator 220 is connected to the other end of the optical waveguide type grating element 100. The optical circulator 210 has first terminal 211, second terminal 212, and third terminal 213 and is configured so that signal light entering through the first terminal 211 is outputted through the second terminal 212 into the optical waveguide type grating element 100 and signal light entering through the second terminal 212 is outputted through the third terminal 213. The optical circulator 220 has first terminal 221, second terminal 222, and third terminal 223 and is configured so that signal light entering through the first terminal 221 is outputted through the second terminal 222 into the optical waveguide type grating element 100 and signal light entering through the second terminal 222 is outputted through the third terminal 223.

In this multiplexer/demultiplexer module 10, signal channels of wavelengths $\lambda_1-\lambda_M$ (except for the wavelengths $\lambda_{m1}-\lambda_{m4}$) injected through the first terminal 211 of the optical circulator 210 are outputted through the second terminal 212 of the optical circulator 210 into the optical waveguide type grating element 100. These signal channels pass the optical waveguide type grating element 100 as they are. Then they enter the second terminal 222 of the optical circulator 220 and thereafter are outputted from the third terminal 223 of the optical circulator 220. The signal channels of the wavelengths $\lambda_{m1}-\lambda_{m4}$ injected through the first terminal 221 of the optical circulator 220 are outputted through the second terminal 222 of the optical circulator 220 into the optical waveguide type grating element 100 and are reflected by the optical waveguide type grating element 100. Then these signal channels enter the second terminal 222 of the optical circulator 220 and thereafter are outputted from the third terminal 223 of the optical circulator 220. Namely, in this case, the multiplexer/demultiplexer module 10 operates as a multiplexer to multiplex the signal channels of the wavelengths $\lambda_1-\lambda_M$ (except for the wavelengths $\lambda_{m1}-\lambda_{m4}$) injected through the first terminal 211 of the optical circulator 210, with the signal channels of the wavelengths $\lambda_{m1}-\lambda_{m4}$ injected through the first terminal 221 of the optical circulator 220. The multiplexed signal channels of the wavelengths $\lambda_1-\lambda_M$ are outputted through the third terminal 223 of the optical circulator 220. In the case where the multiplexer/demultiplexer module 10 is used only as a multiplexer, the optical circulator 210 can be omitted.

In the multiplexer/demultiplexer module 10, the signal channels of the wavelengths $\lambda_1-\lambda_M$ injected through the first terminal 211 of the optical circulator 210 are outputted through the second terminal 212 of the optical circulator 210 into the optical waveguide type grating element 100. The signal channels of the wavelengths $\lambda_{m1}-\lambda_{m4}$ among these signal channels are reflected by the optical waveguide type grating element 100. The reflected signal channels are further guided to the second terminal 212 of the optical circulator 210 and are then outputted from the third terminal 213 of the optical circulator 210. On the other hand, the signal channels of the wavelengths $\lambda_1-\lambda_M$ (except for the wavelengths $\lambda_{m1}-\lambda_{m4}$) pass through the optical waveguide type grating element 100 and enter the second terminal 222 of the optical circulator 220. Then these input signal channels are outputted from the third terminal 223 of the optical circulator 220. Namely, in this case, the multiplexer/demultiplexer module 10 operates as a demultiplexer to demultiplex the signal channels of the wavelengths $\lambda_{m1}-\lambda_{m4}$ from the signal channels of the wavelengths $\lambda_1-\lambda_M$ injected through the first terminal 211 of the optical circulator 210, output the signal channels of the wavelengths $\lambda_{m1}-\lambda_{m4}$ from the third terminal 213 of the optical circulator 210, and output the signal channels of the wavelengths $\lambda_1-\lambda_M$ (except for the wavelengths $\lambda_{m1}-\lambda_{m4}$) from the third terminal 223 of the optical circulator 220. In the case where the multiplexer/demultiplexer module 10 is used only as a demultiplexer, the optical circulator 220 can be omitted.

Furthermore, this multiplexer/demultiplexer module 10 also operates as an optical ADM (Add-Drop Multiplexer) while operating as a multiplexer and as a demultiplexer as well. Namely, the multiplexer/demultiplexer module 10 operates to output (Drop) the signal channels of the wavelengths $\lambda_{m1}-\lambda_{m4}$ among the signal channels of the wavelengths $\lambda_1-\lambda_M$ injected through the first terminal 211 of the optical circulator 210 and to input (Add) the signal channels of the wavelengths $\lambda_{m1}-\lambda_{m4}$ carrying other information through the first terminal 221 of the optical circulator 220. On the other hand, the multiplexer/demultiplexer module 10 multiplexes the signal channels except for the signal channels of the wavelengths $\lambda_{m1}-\lambda_{m4}$ among the signal channels of the wavelengths $\lambda_1-\lambda_M$ injected through the first terminal 211 of the optical circulator 210, with the signal channels of the wavelengths $\lambda_1-\lambda_M$ injected through the first terminal 221 of the optical circulator 220, and outputs the multiplexed signal channels of the wavelengths $\lambda_1-\lambda_M$ through the third terminal 223 of the optical circulator 220.

The multiplexer/demultiplexer module 10 incorporates the optical waveguide type grating element 100 that can function as a single body as described above, that is thus compact and has the small chromatic dispersion, and that is symmetric with respect to the center in the longitudinal direction. Therefore, this multiplexer/demultiplexer module 10 involves the small group delay in the reflection of the signal channels in the reflection band by the grating 113 of the optical waveguide type grating element 100, and it is thus feasible to restrain the waveform degradation of the reflected signal channels and achieve implementation of large-volume WDM transmission with the multiplexer/demultiplexer module 10. The multiplexer/demultiplexer module 10 is compact in size, and inclusion of only one optical waveguide type grating element is sufficient for the module capable of achieving both multiplexing and demultiplexing (optical ADM); therefore, the module is also compact in this respect.

Figure 20:
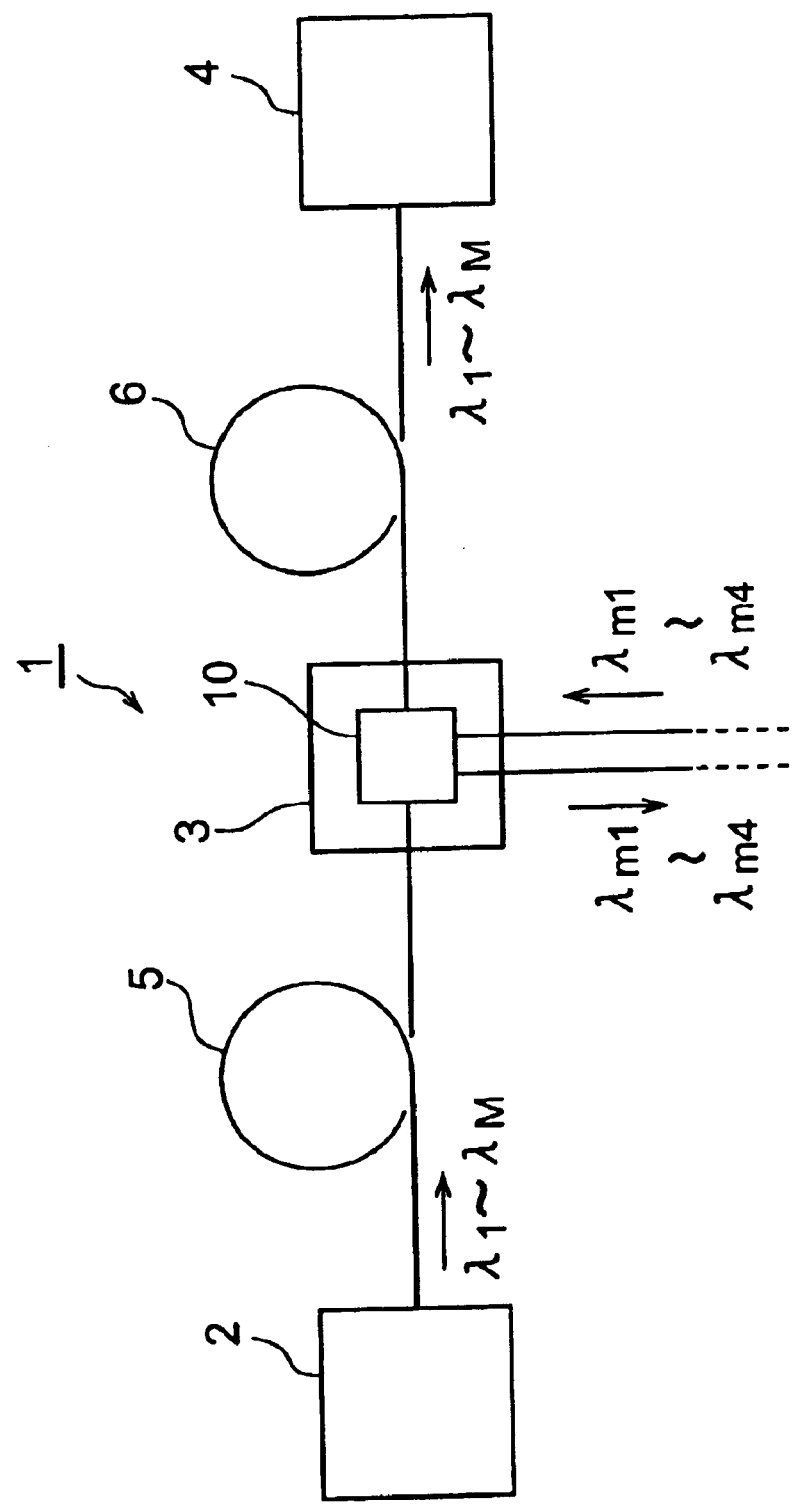
FIG. 20 is a diagram showing a configuration of an optical transmission system according to the present invention.

An embodiment of the optical transmission system according to the present invention will be described next. FIG. 20 is a diagram showing a configuration of the optical transmission system according to the present invention. In this optical transmission system 1, transmitter 2 and repeater 3 are connected through an optical fiber transmission line 5 and repeater 3 and receiver 4 are also connected through an optical fiber transmission line 6. The multiplexer/demultiplexer module 10 is provided in the repeater 3.

The transmitter 2 sends multiplexed signal light in which the signal channels of wavelengths $\lambda_1-\lambda_M$ are multiplexed, onto the optical fiber transmission line 5. The repeater 3 receives the signal channels of the wavelengths $\lambda_1-\lambda_M$ having propagated through the optical fiber transmission line 5, demultiplexes them in the multiplexer/demultiplexer module 10, outputs the signal channels except for the signal channels of the wavelengths $\lambda_{m1}-\lambda_{m4}$ into the optical fiber transmission line 6, and outputs the signal channels of the wavelengths $\lambda_{m1}-\lambda_{m4}$ into another optical fiber transmission line. The repeater 3 transmits the signal channels of the wavelengths $\lambda_{m1}-\lambda_{m4}$ injected through another optical fiber transmission line, into the optical fiber transmission line 6 by the multiplexer/demultiplexer module 10. The receiver 4 receives the signal channels of the wavelengths $\lambda_1-\lambda_M$ having propagated through the optical fiber transmission line 6 and demultiplexes these signal channels wavelength by wavelength.

The optical transmission system 1 multiplexes or demultiplexes the signal channels of the wavelengths $\lambda_1-\lambda_M$ by application of the multiplexer/demultiplexer module 10 incorporating the optical waveguide type grating element 100 of the structure as described above (the optical waveguide type grating element according to the present invention). Accordingly, the system involves only the small group delay difference occurring in the reflection of the signal channels of the wavelengths $\lambda_{m1}-\lambda_{m4}$ in the reflection band by the optical waveguide type grating element 100 in the multiplexer/demultiplexer module 10 in the repeater 3, and it is thus feasible to restrain the waveform degradation of the reflected signal channels of the wavelengths $\lambda_{m1}$–$\lambda_{m4}$ and to achieve the implementation of large-volume WDM transmission.

The present invention is by no means intended to be limited to the embodiments described above, but can be modified in various ways. For example, the optical waveguide type grating element described above was obtained by forming the grating of the index modulation in the optical fiber as an optical waveguide. However, without having to be limited to this, it can also be obtained by forming the grating of the index modulation in an optical waveguide formed on a flat substrate.

According to the present invention, as described above, the deviation of the group delay time of each of the plurality of signal channels in the reflection band, which is caused by reflection in the grating, is small in the above reflection wavelength range centered around the center wavelength of each signal light. For this reason, it is feasible to decrease the chromatic dispersion occurring in the selective reflection of each of the plurality of signal channels in the reflection band.

Since the multiplexer/demultiplexer module incorporating the optical waveguide type grating element involves the small group delay difference occurring in the reflection of the signal channels in the reflection band by the grating, the waveform degradation of the reflected signal channels is well restrained. In addition, the optical transmission system incorporating the multiplexer/demultiplexer module restrains the degradation of the signal waveform as described above, and thus can implement large-volume WDM transmission.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical waveguide type grating element for selectively reflecting each of signal channels in a reflection band out of a plurality of signal channels spaced at a channel spacing $\lambda_i$, said optical waveguide type grating element comprising:

an optical waveguide in which signal light including the plurality of signal channels propagates; and a grating which is an index modulation formed over a predetermined range of said optical waveguide, wherein the optical waveguide type grating element has a transmittance of −20 dB or less for each of the signal channels in the reflection band and has a reflectance of −20 dB or less for each of signal channels outside the reflection band, and wherein a deviation of a group delay time of each of the signal channels in the reflection band, which is caused by reflection in said grating, is 10 ps or less in a wavelength range of ($\lambda_{CH}$−$\lambda_i$×0.375/2) or more but ($\lambda_{CH}$+$\lambda_i$×0.375/2) or less, where $\lambda_{CH}$ is a center wavelength of each signal channel.

2. An optical waveguide type grating element according to claim 1, wherein said optical waveguide type grating element has the reflectance of −30 dB or less for each of the signal channels outside the reflection band.

3. An optical waveguide type grating element according to claim 1, wherein the deviation of the group delay time of each of the signal channels in the reflection band, which is caused by reflection in said grating, is 1 ps or less in the wavelength range of ($\lambda_{CH}$−$\lambda_i$×0.375/2) or more but ($\lambda_{CH}$+$\lambda_i$×0.375/2) or less, where $\lambda_{CH}$ is the center wavelength of each signal channel.

4. An optical waveguide type grating element according to claim 1, wherein an absolute value of a chromatic dispersion of each of the signal channels in the reflection band, which is caused by reflection in the grating, is 0.8 ps/nm or less in the wavelength range of ($\lambda_{CH}$−$\lambda_i$×0.375/2) or more but ($\lambda_{CH}$+$\lambda_i$×0.375/2) or less, where $\lambda_{CH}$ is the center wavelength of each signal channel.

5. An optical waveguide type grating element according to claim 1, wherein an amplitude profile of the index modulation formed over the predetermined range of said optical waveguide has a phase inverted portion.

6. An optical waveguide type grating element according to claim 1, wherein absolute values of amplitudes of the index modulation formed over the predetermined range of said optical waveguide are symmetric with respect to a center of the predetermined range.

7. An optical waveguide type grating element according to claim 1, wherein transmittances for the respective signal channels in the reflection band are different from each other.

8. An optical waveguide type grating element according to claim 1, wherein a transmittance for a signal channel of a shortest wavelength or for a signal channel of a longest wavelength out of the signal channels in the reflection band is different from a transmittance at a center wavelength of the reflection band.

9. A method of producing an optical waveguide type grating element according to claim 1, said method comprising the steps of:

expressing the index modulation corresponding to said grating by a sum of functions of respective index modulation periods;

performing optimization designing of values of the respective index modulation periods; and producing said optical waveguide type grating element on the basis of the index modulation periods thus designed.

10. A method according to claim 9, wherein the designing of the index modulation periods is configured to allow for manufacturing error so as to achieve a good optical characteristic even with variation of index modulation amounts.

11. A method of producing an optical waveguide type grating element according to claim 1, said method comprising the steps of:

designing an amplitude profile of the index modulation corresponding to said grating by nonlinear programming; and producing said optical waveguide type grating element on the basis of the amplitude profile obtained.

12. A multiplexer/demultiplexer module comprising an optical waveguide type grating element according to claim 1, said multiplexer/demultiplexer module selectively reflecting each of the signal channels in the reflection band by means of said optical waveguide type grating element, thereby effecting multiplexing or demultiplexing of the signal channels.

13. An optical transmission system for transmitting multiplexed signal light in which a plurality of signal channels are multiplexed, said optical transmission system comprising said multiplexer/demultiplexer module according to claim 12.

* * * * *